US006483546B1

(12) United States Patent
Kondo et al.

(10) Patent No.: US 6,483,546 B1
(45) Date of Patent: Nov. 19, 2002

(54) PICTURE INFORMATION CONVERTING APPARATUS, PICTURE INFORMATION CONVERTING METHOD, AND TELEVISION RECEIVER

(75) Inventors: Tetsujiro Kondo, Tokyo (JP); Yasushi Tatehira, Kanagawa (JP); Nobuyuki Asakura, Tokyo (JP); Masashi Uchida, Tokyo (JP); Takuo Morimura, Kanagawa (JP); Kazutaka Ando, Kanagawa (JP); Hideo Nakaya, Kanagawa (JP); Tsutomu Watanabe, Kanagawa (JP); Satoshi Inoue, Kanagawa (JP); Wataru Niitsuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/378,065

(22) Filed: Aug. 20, 1999

(30) Foreign Application Priority Data

Aug. 24, 1998 (JP) ............................................ 10-237313

(51) Int. Cl.⁷ ............................ H04N 7/01; H04N 11/00

(52) U.S. Cl. ...................................... 348/458; 348/448

(58) Field of Search .................................. 348/458, 448, 348/452, 451, 441, 446, 443; H04N 7/01, 11/00

(56) References Cited

U.S. PATENT DOCUMENTS

| 4,941,045 A | * 7/1990 | Birch ....................... 348/409.1 |
| 5,049,990 A | 9/1991 | Kondo et al. |
| 5,469,216 A | * 11/1995 | Takahashi et al. .......... 348/441 |
| 5,903,481 A | 5/1999 | Kondo et al. |
| 5,946,044 A | 8/1999 | Kondo et al. |
| 5,966,183 A | 10/1999 | Kondo et al. |

FOREIGN PATENT DOCUMENTS

| EP | 0 843 475 | 5/1998 |
| EP | 0 859 513 | 8/1998 |
| EP | 0 883 303 | 12/1998 |
| JP | 08 265711 | 10/1996 |

OTHER PUBLICATIONS

Patent Abstracts of Japan vol. 1997, No. 7, Jul. 31, 1997 & JP 09 074543 A (SONY), Mar. 18, 1997.

* cited by examiner

Primary Examiner—Michael H. Lee
(74) Attorney, Agent, or Firm—Frommer Lawrence & Haug LLP; William S. Frommer; Darren M. Simon

(57) ABSTRACT

A picture information converting apparatus for generating an output picture signal with a different scanning line structure from an input picture signal is disclosed, that comprises a first picture data selecting means for selecting adjacent pixels with a predetermined relation of positions to a plurality of considered points with a different relation of positions to scanning lines of the input picture signal, a spatial class detecting means for detecting a pattern of a level distribution from picture data selected by said first picture data selecting means and determining spacial class values that represent spatial classes of the considered points corresponding to the detected pattern, a second picture data selecting means for selecting the considered points and adjacent pixels with the predetermined relation of positions to the considered points from the input picture signal, a calculating process means for performing a calculating process for predicting and generating pixels at positions with a predetermined relation of positions to the considered points corresponding to the picture data obtained by said second picture data selecting means, a storing means for storing predetermined predictive coefficient data used in the calculating process of said calculating process means, and a class value converting means for performing a class value converting process for a first class value with a relation of positions to the considered points and the input picture signal and generating a second class value corresponding to the predictive coefficient data.

28 Claims, 16 Drawing Sheets

PICTURE INFORMATION CONVERTING APPARATUS, PICTURE INFORMATION CONVERTING METHOD, AND TELEVISION RECEIVER

BACKGROUND OF THE INVENTION

1. Field of the Invention

The present invention relates to a picture information converting apparatus, a picture information converting method, and a television receiver.

2. Description of the Related Art

To obtain an output picture signal with higher resolution than an input picture signal, a picture information converting process for generating an output scanning line structure with a scanning line structure different from an input picture signal has been proposed. In the picture information converting process, classes are categorized corresponding to a three-dimensional (time-space) distribution of signal levels of the input picture signal. With reference to the obtained class values, pixels are predicted and generated. In such a process, it is more difficult to predict and generate pixels at positions of scanning lines of the input picture signal than pixels at other positions thereof.

Thus, when more classes are assigned to non-scanning-line positions of the input picture signal and pixels are more accurately predicted and generated, a memory that stores data predicted and generated in the class categorizing process can be more effectively used.

However, as the number of classes becomes large, the storage capacity of the memory becomes large. Since the storage capacity of the memory of a real apparatus is restricted, it is necessary to decrease the number of classes.

OBJECT AND SUMMARY OF THE INVENTION

An object of the present invention is to provide a picture information converting apparatus, a picture information converting method, and a television receiver that allow a proper number of classes to be assigned corresponding to the relation of positions of pixels predicted and generated and positions of scanning lines of an input picture signal, conditions such as the storage capacity of a memory disposed in the apparatus, and so forth.

A first aspect of the present invention is a picture information converting apparatus for generating an output picture signal with a different scanning line structure from an input picture signal, comprising a first picture data selecting means for selecting adjacent pixels with a predetermined relation of positions to a plurality of considered points with a different relation of positions to scanning lines of the input picture signal, a spatial class detecting means for detecting a pattern of a level distribution from picture data selected by said first picture data selecting means and determining spacial class values that represent spatial classes of the considered points corresponding to the detected pattern, a second picture data selecting means for selecting the considered points and adjacent pixels with the predetermined relation of positions to the considered points from the input picture signal, a calculating process means for performing a calculating process for predicting and generating pixels at positions with a predetermined relation of positions to the considered points corresponding to the picture data obtained by said second picture data selecting means, a storing means for storing predetermined predictive coefficient data used in the calculating process of said calculating process means, and a class value converting means for performing a class value converting process for a first class value with a relation of positions to the considered points and the input picture signal and generating a second class value corresponding to the predictive coefficient data.

A second aspect of the present invention is a picture information converting apparatus for generating an output picture signal with a different scanning line structure from an input picture signal, comprising a first picture data selecting means for selecting adjacent pixels with a predetermined relation of positions to a plurality of considered points with a different relation of positions to scanning lines of the input picture signal, a spatial class detecting means for detecting a pattern of a level distribution from picture data selected by said first picture data selecting means and determining spacial class values that represent spatial classes of the considered points corresponding to the detected pattern, a second picture data selecting means for selecting adjacent pixels with the predetermined relation of positions to the considered points from a plurality of frames of the input picture signal, a motion class detecting means for calculating the sum of the absolute values of frame differences with the picture data selected by said second picture data selecting means and determining motion class values corresponding to the calculated result, the motion class values representing motions, a class combining means for combining the spatial class values and the motion class values so as to generate a first class value, a third picture data selecting means for selecting the considered points and adjacent pixels with the predetermined relation of positions to the considered points from the input picture signal, a calculating process means for performing a calculating process for predicting and generating pixels at positions with a predetermined relation of positions to the considered points corresponding to the picture data obtained by said third picture data selecting means, a storing means for storing predetermined predictive coefficient data used in the calculating process of said calculating process means, and a class value converting means for performing a class value converting process for the first class value with a relation of positions to the considered points and the input picture signal and generating a second class value corresponding to the predictive coefficient data.

A third aspect of the present invention is a picture information converting method for generating an output picture signal with a different scanning line structure from an input picture signal, comprising the steps of (a) selecting adjacent pixels with a predetermined relation of positions to a plurality of considered points with a different relation of positions to scanning lines of the input picture signal, (b) detecting a pattern of a level distribution from picture data selected at step (a) and determining spacial class values that represent spatial classes of the considered points corresponding to the detected pattern, (c) selecting the considered points and adjacent pixels with the predetermined relation of positions to the considered points from the input picture signal, (d) performing a calculating process for predicting and generating pixels at positions with a predetermined relation of positions to the considered points corresponding to the picture data obtained at step (c), (e) storing predetermined predictive coefficient data used in the calculating process of step (d), and (f) performing a class value converting process for a first class value with a relation of positions to the considered points and the input picture signal and generating a second class value corresponding to the predictive coefficient data.

A forth aspect of the present invention is a picture information converting method for generating an output picture signal with a different scanning line structure from an input picture signal, comprising the steps of (a) selecting adjacent pixels with a predetermined relation of positions to a plurality of considered points with a different relation of positions to scanning lines of the input picture signal, (b) detecting a pattern of a level distribution from picture data selected at step (a) and determining spacial class values that represent spatial classes of the considered points corresponding to the detected pattern, (c) selecting adjacent pixels with the predetermined relation of positions to the considered points from a plurality of frames of the input picture signal, (d) calculating the sum of the absolute values of frame differences with the picture data selected at step (c) and determining motion class values corresponding to the calculated result, the motion class values representing motions, (e) combining the spatial class values and the motion class values so as to generate a first class value, (f) selecting the considered points and adjacent pixels with the predetermined relation of positions to the considered points from the input picture signal, (g) performing a calculating process for predicting and generating pixels at positions with a predetermined relation of positions to the considered points corresponding to the picture data obtained at step (f), (h) storing predetermined predictive coefficient data used in the calculating process of step (g), and (i) performing a class value converting process for the first class value with a relation of positions to the considered points and the input picture signal and generating a second class value corresponding to the predictive coefficient data.

A fifth aspect of the present invention is a television receiver for generating an output picture signal with a different scanning line structure from an input picture signal, comprising a first picture data selecting means for selecting adjacent pixels with a predetermined relation of positions to a plurality of considered points with a different relation of positions to scanning lines of the input picture signal, a spatial class detecting means for detecting a pattern of a level distribution from picture data selected by said first picture data selecting means and determining spacial class values that represent spatial classes of the considered points corresponding to the detected pattern, a second picture data selecting means for selecting the considered points and adjacent pixels with the predetermined relation of positions to the considered points from the input picture signal, a calculating process means for performing a calculating process for predicting and generating pixels at positions with a predetermined relation of positions to the considered points corresponding to the picture data obtained by said second picture data selecting means, a storing means for storing predetermined predictive coefficient data used In the calculating process of said calculating process means, and a class value converting means for performing a class value converting process for a first class value with a relation of positions to the considered points and the Input picture signal and generating a second class value corresponding to the predictive coefficient data.

A sixth aspect of the present invention is a television receiver for generating an output picture signal with a different scanning line structure from an input picture signal, comprising a first picture data selecting means for selecting adjacent pixels with a predetermined relation of positions to a plurality of considered points with a different relation of positions to scanning lines of the input picture signal, a spatial class detecting means for detecting a pattern of a level distribution from picture data selected by said first picture data selecting means and determining spacial class values that represent spatial classes of the considered points corresponding to the detected pattern, a second picture data selecting means for selecting adjacent pixels with the predetermined relation of positions to the considered points from a plurality of frames of the input picture signal, a motion class detecting means for calculating the sum of the absolute values of frame differences with the picture data selected by said second picture data selecting means and determining motion class values corresponding to the calculated result, the motion class values representing motions, a class combining means for combining the spatial class values and the motion class values so as to generate a first class value, a third picture data selecting means for selecting the considered points and adjacent pixels with the predetermined relation of positions to the considered points from the input picture signal, a calculating process means for performing a calculating process for predicting and generating pixels at positions with a predetermined relation of positions to the considered points corresponding to the picture data obtained by said third picture data selecting means, a storing means for storing predetermined predictive coefficient data used in the calculating process of said calculating process means, and a class value converting means for performing a class value converting process for the first class value with a relation of positions to the considered points and the input picture signal and generating a second class value corresponding to the predictive coefficient data.

According to the present invention, the number of classes for each of considered points (pixels) is properly assigned corresponding to a relation that represents whether or not each considered point is present at a position on a scanning line of an input picture signal or corresponding to a condition such as the storage capacity of a memory of the apparatus.

As prior art references of the present invention, the following patent application was filed by the applicant of the present invention and the following U.S. Patent was granted thereto.

(1) Japanese Patent Application No. H09-115437 (U.S. patent application corresponding thereto is now pending), (2) Japanese Patent Application No. H10-228221 (U.S. patent application corresponding thereto is now pending), and (3) U.S. Pat. No. 5,049,990

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Before explaining embodiments of the present invention, a picture information converting process that is a major feature of the present invention will be described. In the picture information converting process, a digital picture signal with standard resolution (hereinafter this signal is referred to as SD signal) is converted into a picture signal with high resolution (sometimes this signal is referred to as HD signal) and the resultant signal is output. An example of the SD signal is an interlace picture signal with 525 scanning lines (hereinafter this signal is referred to as 525i signal). A example of the HD signal is a progressive signal with 525 scanning lines (hereinafter this signal is referred to as 525p signal). The number of pixels in the horizontal direction of the output picture signal is twice as many as that of the input picture signal.

In the picture information converting process, the resolution of the input picture signal is improved by a class categorization adaptive process proposed by the applicant of the present invention. The class categorization adaptive process is different from a conventional method of which a signal with high resolution is obtained by an interpolating process. In other words, in the class categorization adaptive process, classes are categorized corresponding to a three-dimensional (time-space) distribution of signal levels of the input SD signal. Predicted values for individual classes are leant and stored to a particular storing portion. An optimum estimated value is calculated and obtained corresponding to a predictive expression. In the class categorization adaptive process, an output signal with higher resolution than an input SD signal can be obtained.

Figure 1:
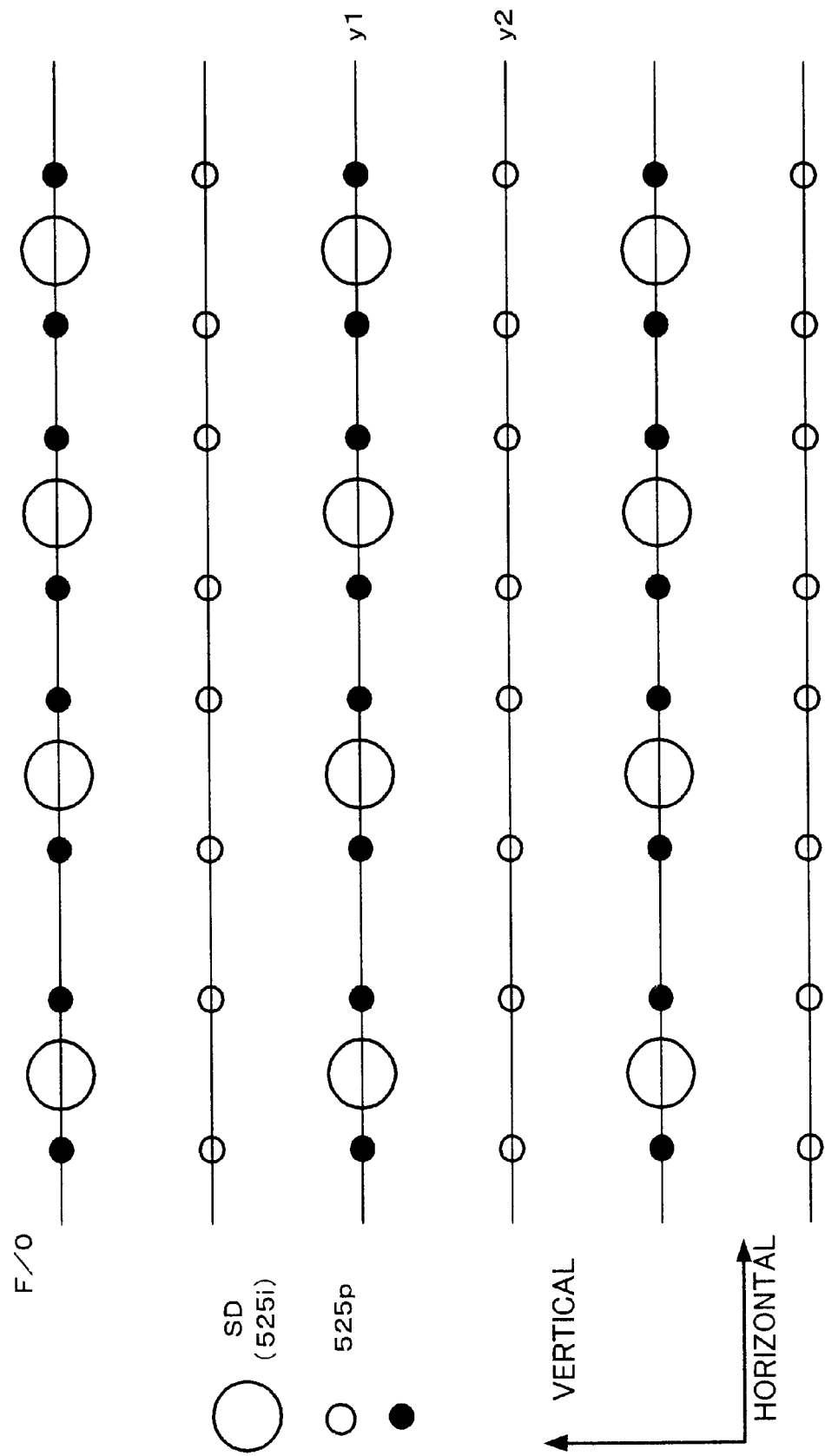
FIG. 1 is a schematic diagram showing an example of the arrangement of pixels in a picture information converting process according to an embodiment of the present invention.

FIG. 1 shows an example of the arrangement of pixels of one field (odd field) in a picture information converting process for converting a 525i signal as an input SD signal into a 525p signal as an output picture signal. In FIG. 1, large dots represent pixels of the 525i signal, whereas small dots represent pixels of 525p signal. The scanning lines of the 525i signal of the odd field spatially deviates by 0.5 lines from that of the even field. As is clear from FIG. 1, with line data y1 (black small dots) at the same position of a line of the 525i signal and line data y2 (white small dots) at the center position between two adjacent lines of the 525i signal, the 525p signal is predicted and generated.

In FIG. 1, y1 represents points that exist, whereas y2 represents points that are newly predicted and generated. Thus, it is more difficult to predict and generate y2 than y1. Consequently, to predict and generate y2, more classes should be assigned than y1. When the memory in the apparatus does not have sufficient storage capacity or the picture information converting process is performed with a small number of classes, the total number of classes should be decreased. Thus, according to the present invention, the number of classes are properly assigned so that y1 and y2 can be effectively and precisely predicted and generated.

Figure 2:
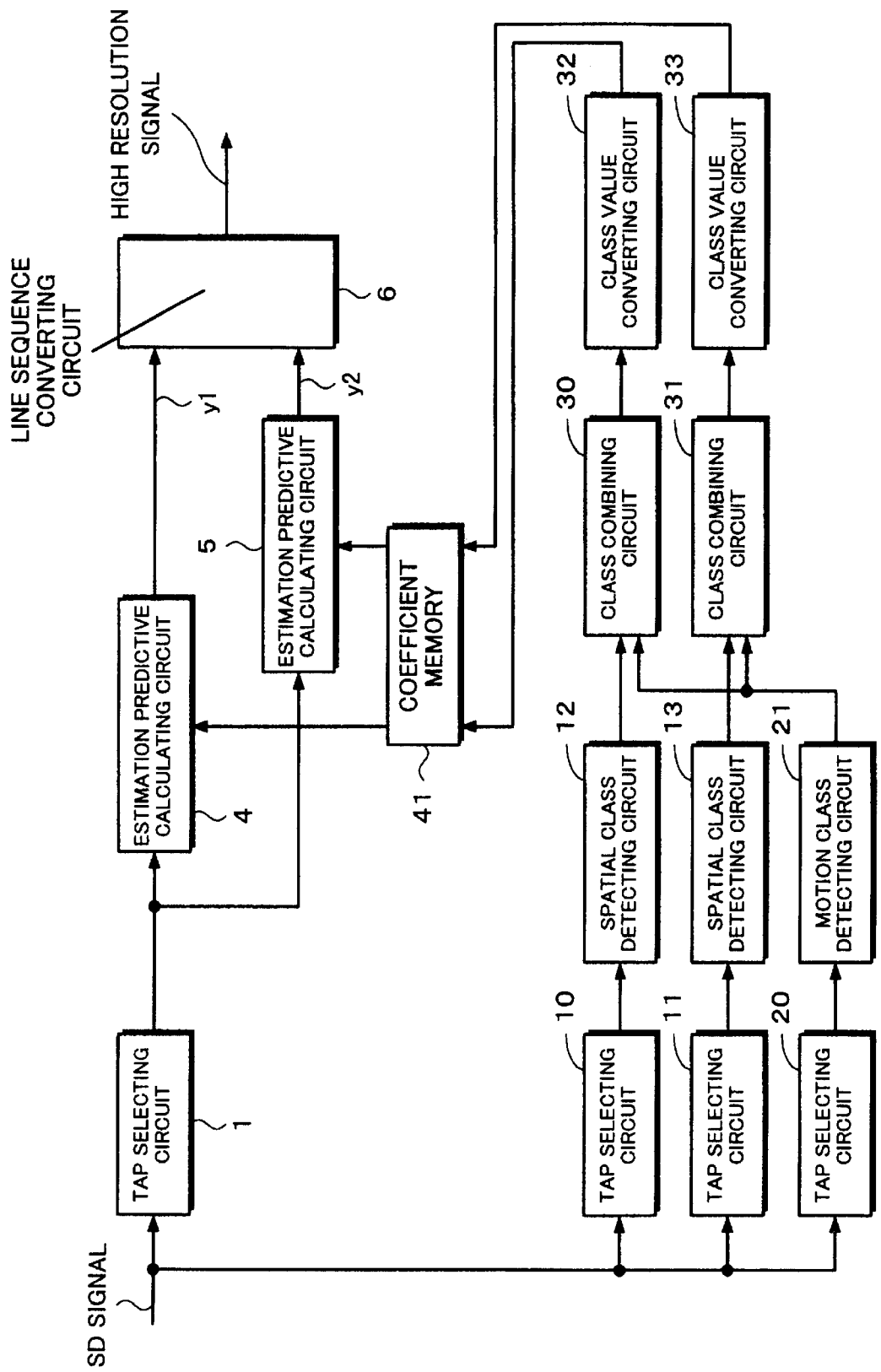
FIG. 2 is a block diagram showing an example of the structure of the picture information converting process system according to the first embodiment of the present invention.

Next, with reference to the accompanying drawings, a first embodiment of the present invention will be described. In the first embodiment, a picture information converting process is performed. In the picture information converting process, a 525i signal as an input SD signal is converted into a 525p signal as an output picture signal. However, it should be noted that the present invention can be applied to signal conversions in other picture signal formats. FIG. 2 is a block diagram showing an example of the structure of a picture information converting process system according to the first embodiment of the present invention. The input SD signal (525i signal) is supplied to tap selecting circuits 1, 10, 11, and 20.

The tap selecting circuit 1 extracts a region of a plurality of pixels necessary for a calculating process (corresponding to formula (1) (that will be described later) for predicting and estimating line data y1 and y2 and selects SD pixels (hereinafter referred to as predictive taps) necessary for predicting and estimating the line data y1 and y2 from the extracted region. The selected predictive taps are supplied to estimation predictive calculating circuits 4 and 5. The predictive taps may be the same as spatial class taps (that will be described later). To improve the predictive accuracy, the predictive taps are selected with predictive tap position information corresponding to classes.

A coefficient memory 41 (that will be described later) supplies predictive coefficients necessary for predicting and estimating the line data y1 and y2 to the estimation predictive calculating circuits 4 and 5, respectively. The estimation predictive calculating circuits 4 and 5 successively predict and generate pixel values y with the predictive taps received from the tap selecting circuit 1 and the predictive coefficients received from the coefficient memory 41 corresponding to the following formula (1).

$$y = w_1 \times x_1 + w_2 \times x_2 + \ldots + w_n \times x_n \qquad (1)$$

where $x_1, \ldots,$ and $x_n$ represent predictive taps; and $w_1, \ldots,$ and $w_n$ are predictive coefficients. In other words, formula (1) is an expression for predicting and generating a pixel value y with n predictive taps. The estimation predictive calculating circuit 4 predicts and generates line data y1 as a sequence of pixel values y. Likewise, the estimation predictive calculating circuit 5 predicts and generates line data y2. The predictive coefficients w1, . . . , and wn of the line data y1 are different from those of the line data y2.

The estimation predictive calculating circuits 4 and 5 supply the line data y1 and y2 to a line sequence converting circuit 6, respectively. The line sequence converting circuit 6 performs a line double speed process for the received line data y1 and y2 and generates a signal with high resolution (referred to as high resolution signal). The high resolution signal is a final output picture signal of the picture information converting process system according to the first embodiment of the present invention. The output picture signal is supplied to a CRT display (not shown). The CRT display has a synchronous system that allows the output picture signal (525p signal) to be displayed. Examples of the input SD signal are a broadcast signal and a reproduction signal of a reproducing apparatus such as a VCR. In other words, the picture information converting process system according to the first embodiment of the present invention can be built in a TV receiver or the like.

Each of the tap selecting circuits 10 and 11 selects SD pixels necessary for detecting spatial classes of the line data y1 and y2 (these pixels are referred to as spatial class taps). The tap selecting circuit 20 selects SD pixels necessary for detecting a motion class of the input SD signal (these pixels are referred to as motion class taps). Output data of the tap selecting circuit 10 is supplied to a spatial class detecting circuit 12. Output data of the tap selecting circuit 11 is supplied to a spatial class detecting circuit 13. Output data of the tap selecting circuit 20 is supplied to a motion class detecting circuit 21.

The spatial class detecting circuits 12 and 13 detect spatial class values of the line data y1 and y2 corresponding to the received spatial class taps and supply the detected spatial class values to class combining circuits 30 and 31, respectively. The motion class detecting circuit 21 detects a motion class value corresponding to the received motion class taps and supplies the detected motion class value to the class combining circuits 30 and 31.

Each of the class combining circuits 30 and 31 combines the received spatial class value and the received motion class value. Output data of the class combining circuit 30 is supplied to a class value converting circuit 32. Output data of the class combining circuit 31 is supplied to a class value converting circuit 33. The class value converting circuits 32 and 33 perform a class value converting process (that will be described later) for output data of the class value combining circuits 32 and 33, respectively. The class value converting process allows the total number of classes to be decreased.

The converted class values are supplied to a coefficient memory 41. The coefficient memory 41 stores predictive coefficients that have been learnt and supplies predictive coefficients corresponding to the class values received from the class value converting circuits 32 and 33 to the estimation predictive calculating circuits 4 and 5. To do that, for example, a method for storing predictive coefficients corresponding to addresses designated with class values obtained in the class value converting process may be used.

Next, a process for detecting a spatial class will be described in detail. Generally, each spatial class detecting circuit detects a spatial pattern of a level distribution of picture data corresponding to a pattern of a level distribution of spatial class taps and generates a spatial class value corresponding to the detected spatial pattern. In this case, to prevent the number of classes from becoming huge, each input pixel is compressed to data with less than eight bits. As examples of such an information compressing process, ADRC (Adaptive Dynamic Range Coding), DPCM (Differential Pulse Code Modulation), and VQ (Vector Quantization) may be used.

The ADRC method is an adaptively re-quantizing method developed for a high efficient encoding process for use with a VCR (Video Cassette Recorder). Since the ADRC method allows a local pattern of a signal level to be effectively represented with a short word length, according to the first embodiment of the present invention, the ADRC method is used to generate a spatial class categorized code. In the ADRC method, the length between the maximum value MAX and the minimum value MIN is equally divided by a designated bit length and re-quantized corresponding to the following formula (1).

$$DR = MAX - MIN + 1$$

$$Q = \{(L - MIN + 0.5) \times 2/DR\} \qquad (2)$$

where DR represents the dynamic range of spatial class taps; L represents the data level of the pixel of each spacial class tap; Q represents a re-quantized code; and { } represents a truncating process.

Figure 3:
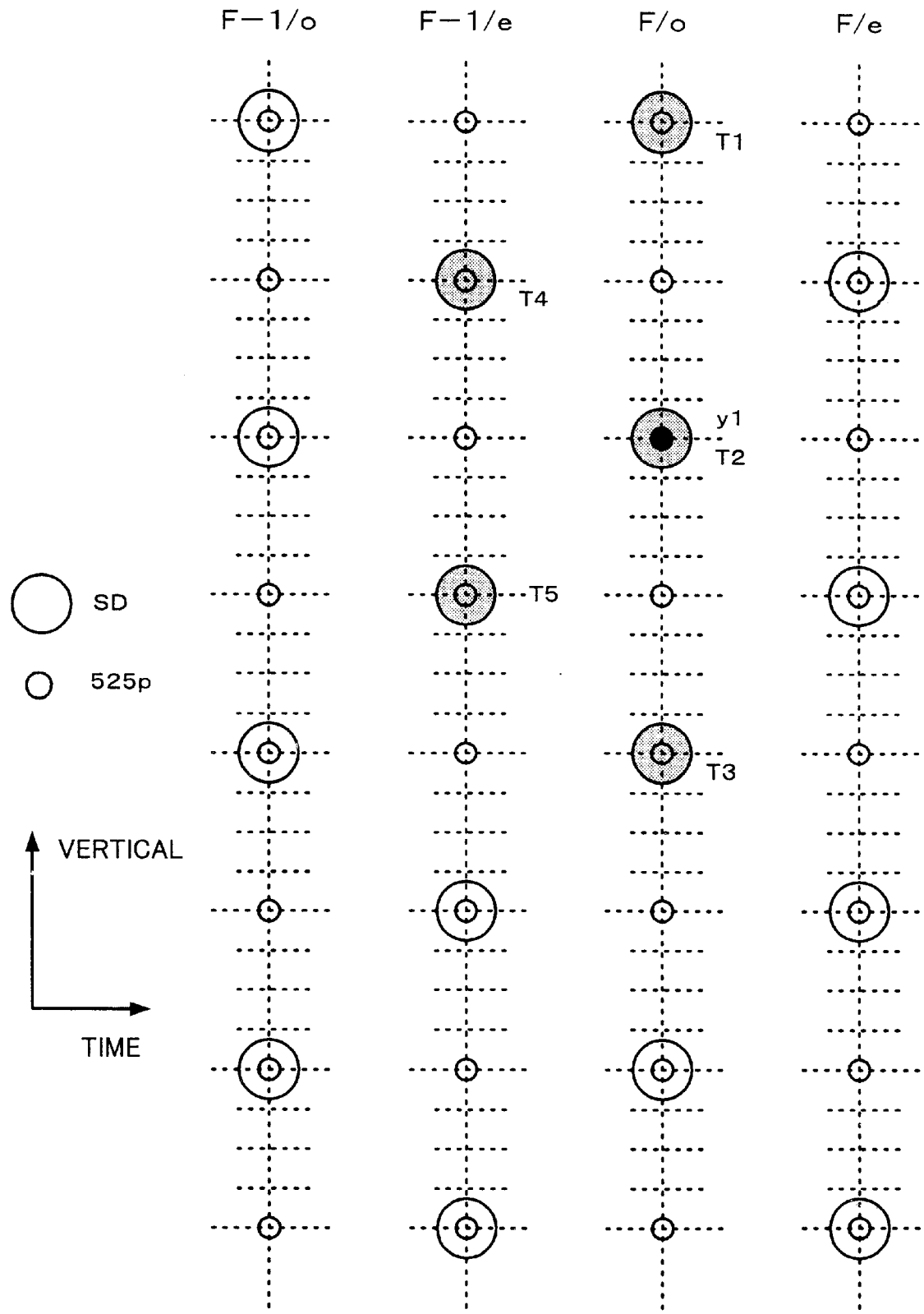
FIG. 3 is a schematic diagram showing an example of the arrangement of spatial class taps of line data y1 according to the first embodiment of the present invention.

As described above, the number of classes of the line data y2 is larger than that of the line data y1. Next, this point will be described in detail. FIG. 3 shows an example of the arrangement of spatial class taps used in the spatial class detecting process for the line data y1. In FIG. 3, when time elapses in the horizontal direction (from left to right), pixels in individual fields are arranged in the vertical direction.

Fields shown in FIG. 3 are denoted by F−1/o (at the leftmost position), F−1/e, F/o, and F/e (at the rightmost position). The field F−1/o represents "a field composed of odd-numbered scanning lines of the (F−1)th frame". Likewise, the field F−1/e represents "a field composed of even-numbered scanning lines of the (F−1)th frame". The field F/o represents "a field composed of odd-numbered scanning lines of the F-th frame". Likewise, the field F/e represents "a field composed of even-numbered scanning lines of the F-th frame".

For example, as spatial class taps of the line data y1 of the field F/o, a total of five pixels pixels T4 and T5 of the field F−1/e and pixels T1, T2, and T3 of the field F/o are used. However, according to the present invention, other spatial class taps may be used. For example, as spatial class taps, a plurality of input pixels in the horizontal direction may be used.

Figure 4:
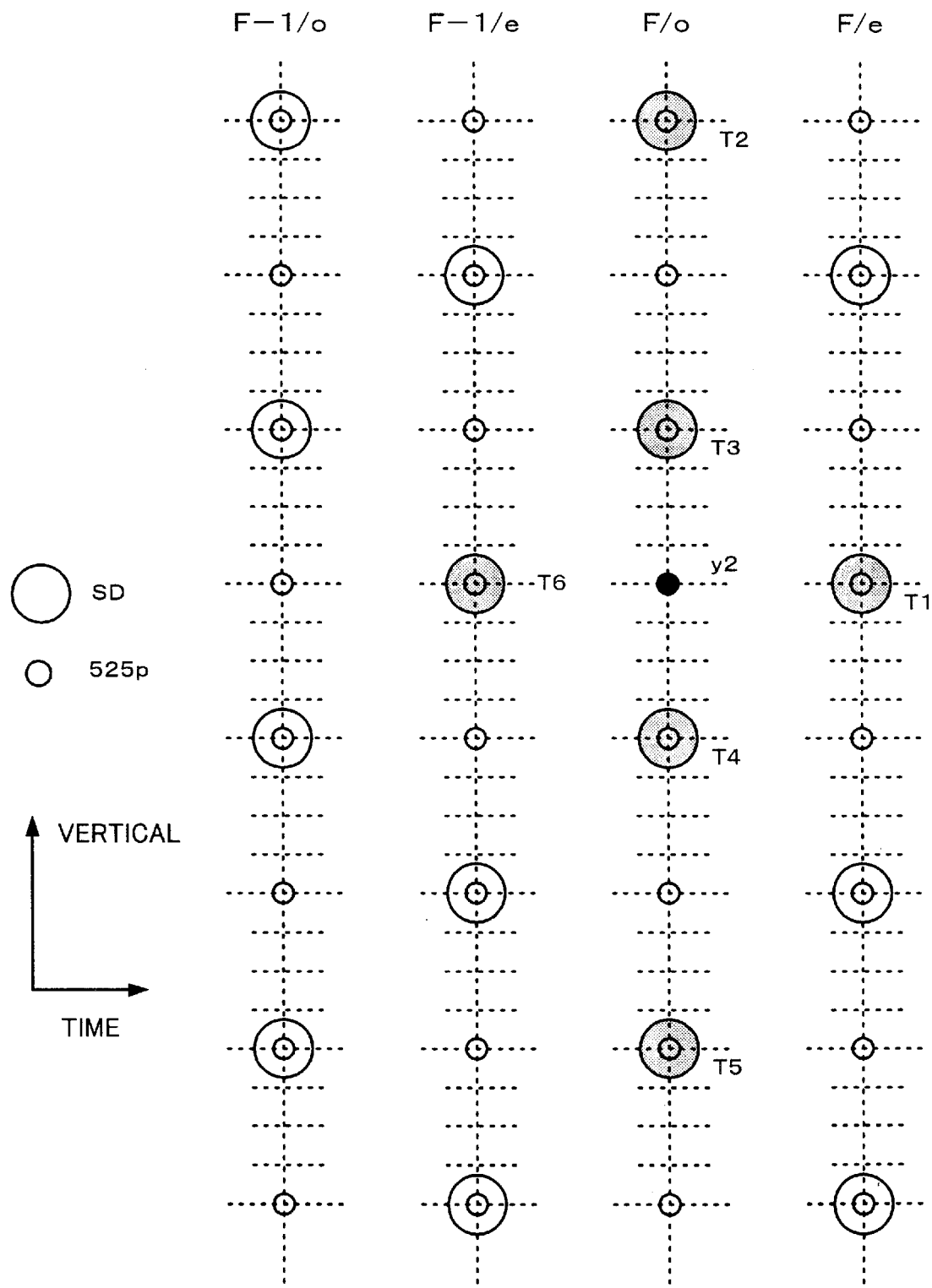
FIG. 4 is a schematic diagram showing an example of the arrangement of spatial class taps of line data y2 according to the first embodiment of the present invention.

FIG. 4 shows an example of the arrangement of spatial class taps used in the spatial class detecting process for the line data y2. The notation of FIG. 4 is the same as the notation of FIG. 3. In this example, as spatial class taps of the line data y2 of the field F/o, a total of six pixels—a pixel T6 of the field F−1/e, pixels T2, T3, T4, and T5 of the field F/o, and a pixel T1 of the field F/e are used. However, according to the present invention, other spatial class taps may be used. For example, as spatial class taps, a plurality of input pixels in the horizontal direction may be used.

Next, the motion class detecting process will be described in detail. The motion class detecting circuit 21 calculates the average value param of the absolute values of frame differences with the received motion class taps corresponding to the following formula (3). The motion class detecting circuit 21 detects a motion class value corresponding to the calculated param value.

$$param = \frac{\sum_{i=1}^{n} |m_i - n_i|}{n} \quad (3)$$

In formula (3), n represents the number of motion class taps. For example, 6 is assigned to n (see FIG. 5). By comparing the param value with a pre-assigned threshold value, a motion class value as an index of a motion is determined. For example, the motion class value is generated as follows.

param 2: motion class value=0

2<param 4: motion class value=1

4<param 8: motion class value=2 param>8: motion class value=3

When the motion class value is 0, the motion is minimum (still picture). As the motion class value becomes large, the motion of the picture becomes large. Alternatively, the motion class may be determined corresponding to a motion vector.

Figure 5:
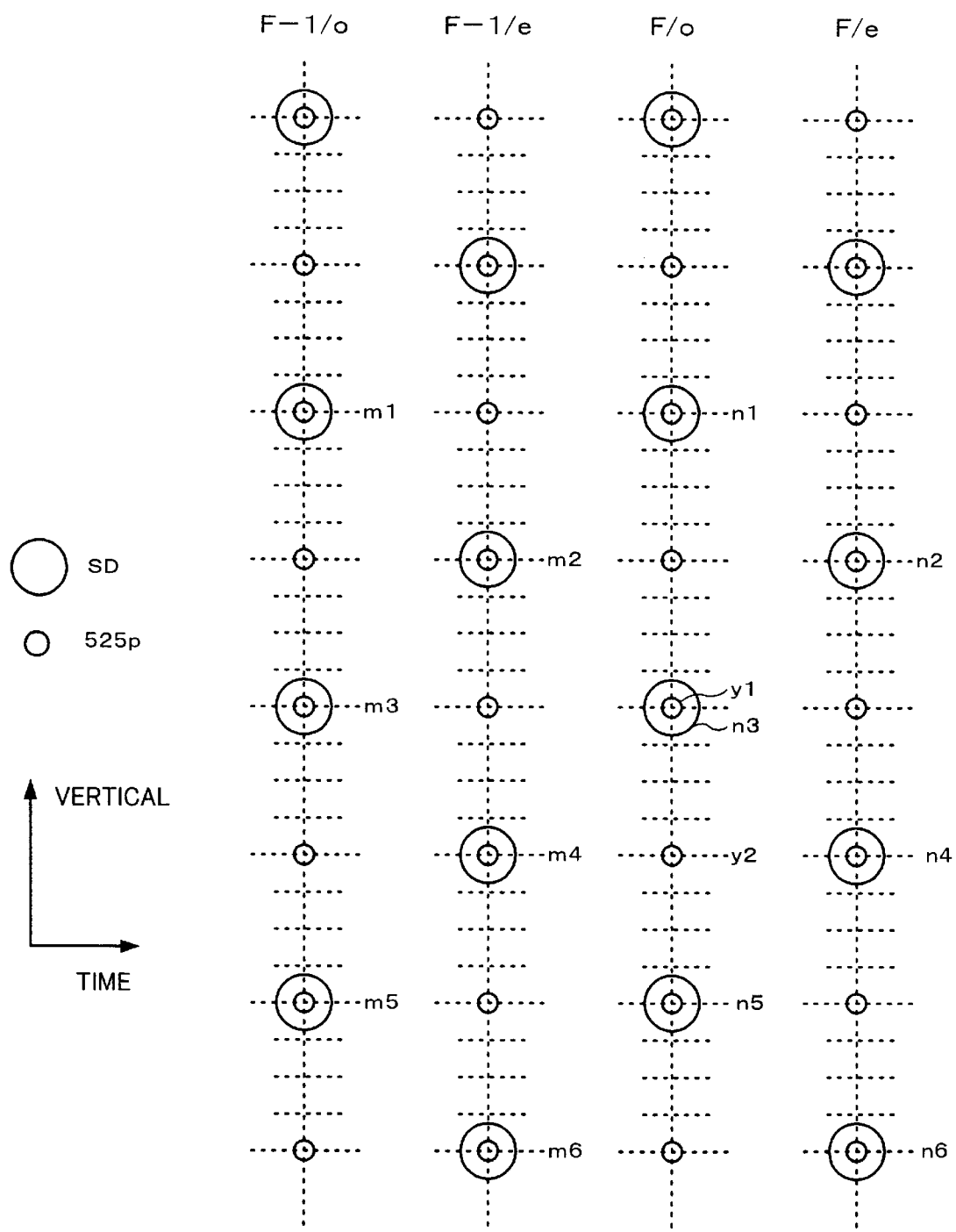
FIG. 5 is a schematic diagram showing an example of the arrangement of motion class taps according to the first embodiment of the present invention.

FIG. 5 shows an example of the arrangement of motion class taps used in the motion class detecting process. For example, as motion class taps used for predicting the line data y1 and y2 of the field F/o, pixels n1, n3, and n5 of the field F/o, pixels n2, n4, and n6 of the field F/e, pixels m2, m4, and m6 of the field F−/e, and pixels m1, m3, and m5 of the field F−1/e are used. In this example, the vertical positions of the pixels m1, m2, . . . , and m6 match those of the pixels n1, n2, . . . , and n6, respectively. However, according to the present invention, other motion class taps may be used.

In the arrangements of spatial class taps shown in FIGS. 3 and 4, when the number of motion classes of each of the line data y1 and y2 is 4, the classes of each of the line data y1 and y2 can be categorized in one-bit ADRC method as follows.

Number of classes of line data y1=25×4=128

Number of classes of line data y2=26×4=256

Figure 6:
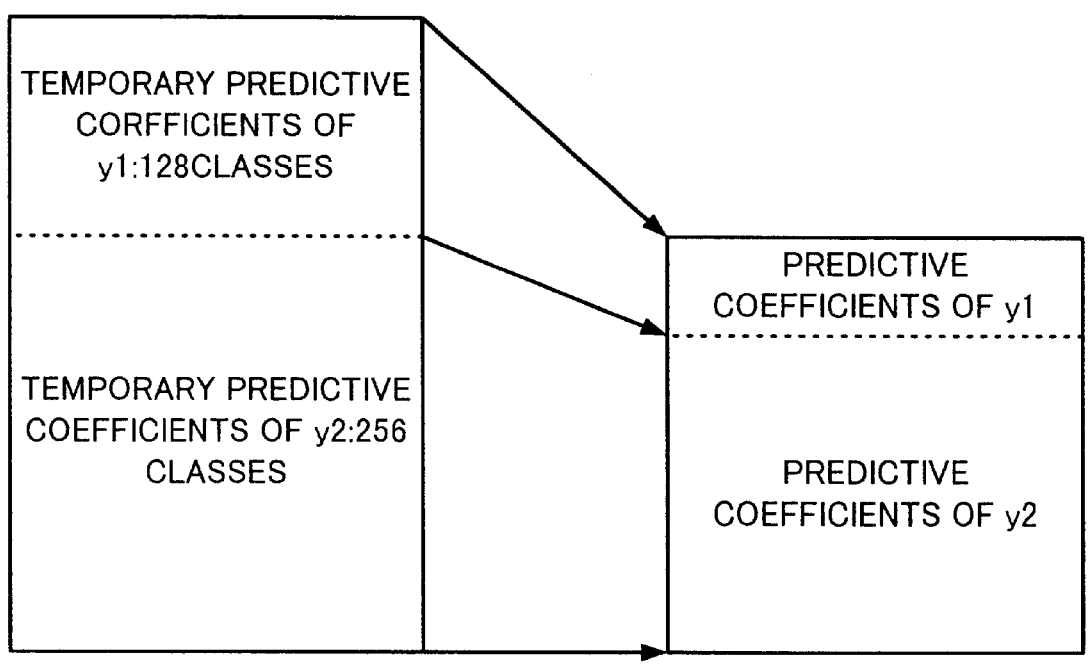
FIG. 6 is a schematic diagram for explaining a class integration according to the first embodiment of the present invention.

In this case, the total number of classes is 384. However, when the memory resource (the coefficient memory 41 shown in FIG. 2) of the picture information converting process system does not have sufficient storage capacity for 384 classes or when the picture information converting process is effectively performed with a smaller number of classes, it is necessary to decrease the total number of classes. Thus, according to the present invention, with a class value converting process, the numbers of classes of the line data y1 and y2 are decreased. FIG. 6 shows a process for decreasing the total number of classes. Temporary predictive coefficients shown in FIG. 6 will be described later.

Figure 7:
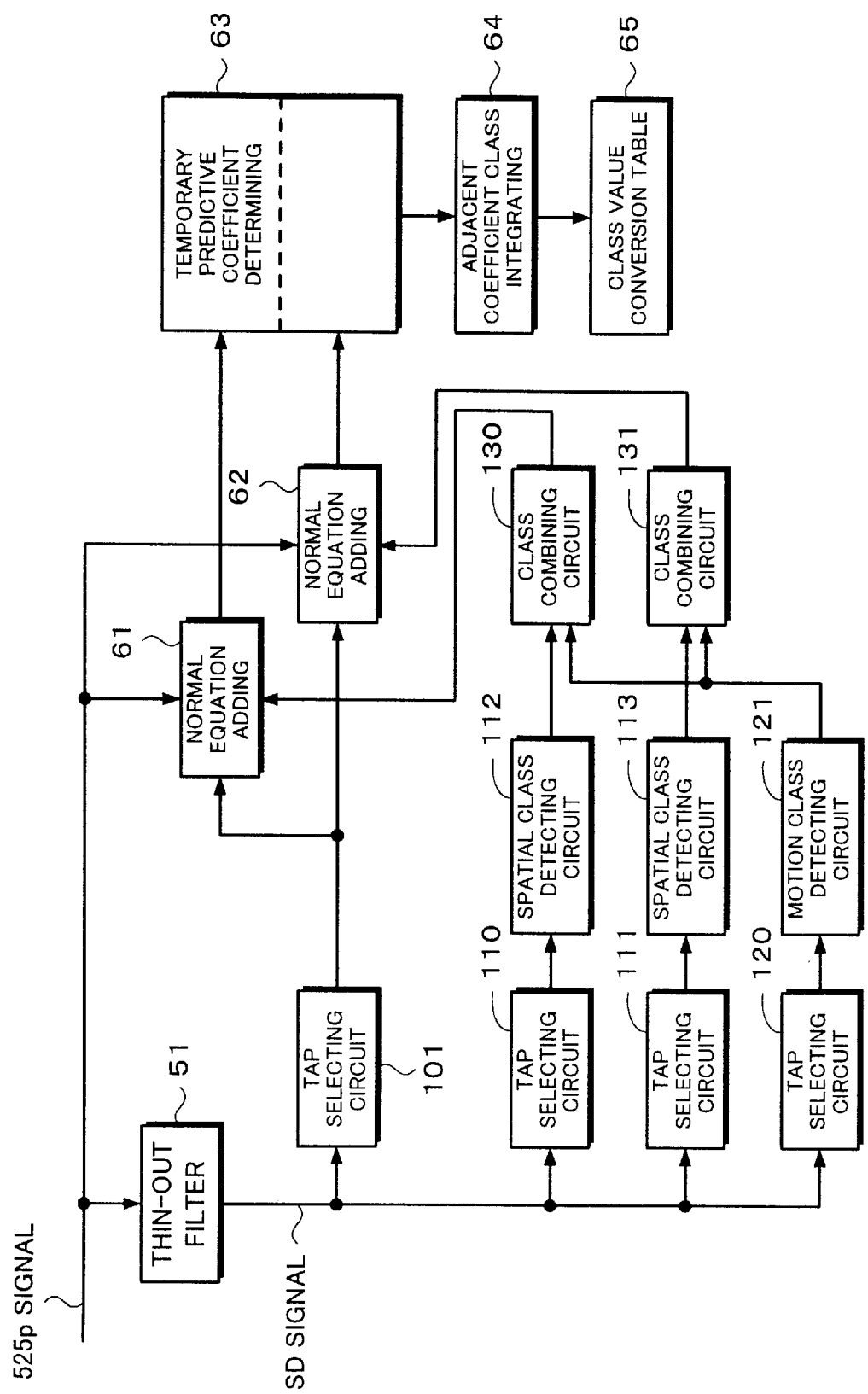
FIG. 7 is a block diagram showing an example of the structure of a class value conversion table generating process system according to the first embodiment of the present invention.

Next, a learning process (namely, a process for setting proper predictive coefficients) will be described. FIG. 7 shows an example of the structure of a process system that generates a class value conversion table as a first learning stage. A known signal (for example, a 525p signal) in the same signal format as an output picture signal is supplied to a thin-out filter 51 and normal equation adding circuits 61 and 62. The thin-out filter 51 thins out the number of pixels by ½ in each of the horizontal and vertical directions. Thus, the thin-out filter 51 generates an SD signal (for example, a 525i signal) with pixels that are ¼ as small as those of the input signal.

In the thin-out process, a vertical thin-out filter thins out pixels of the input picture signal so that the frequency in the vertical direction of the input picture signal is halved. In addition, a horizontal thin-out filter thins out pixels of the input picture signal so that the frequency in the horizontal direction of the input picture signal is halved. By varying the characteristics of the thin-out filter 51, the learning characteristics are varied. Thus, the picture quality of the picture to be converted can be controlled.

Figure 8:
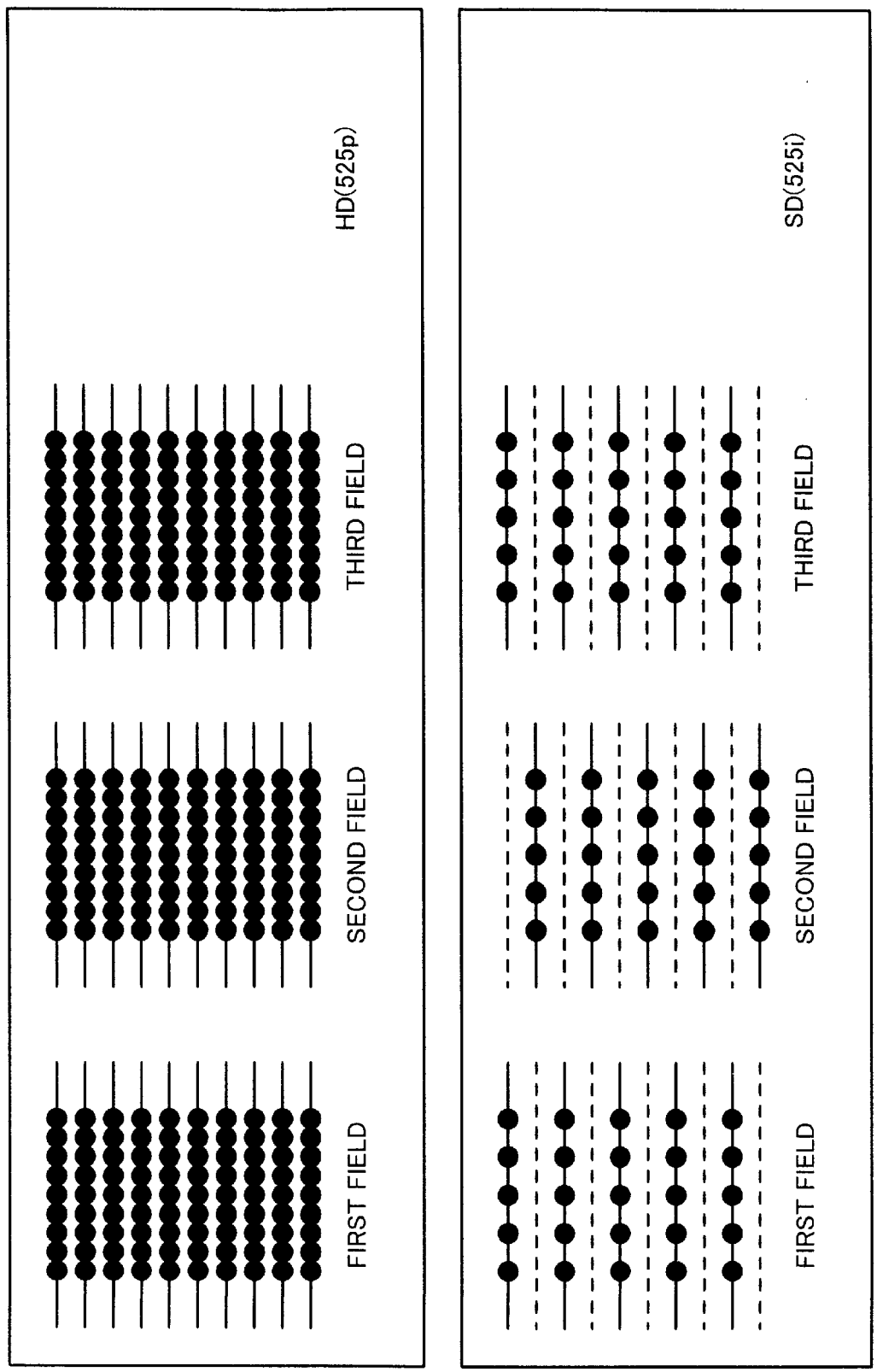
FIG. 8 is a schematic diagram for explaining a thin-out filter process used in the class value conversion table generating process system and a predictive coefficient calculating process system.

FIG. 8 shows the spatial relation between pixels of a 525p signal as an example of the SD signal that is supplied to the thin-out filter 51 and pixels of a 525i signal as an example of the output picture signal of the thin-out filter 51. In the odd-numbered field of the 525p signal, even numbered lines are thinned out. On each odd-numbered line, pixels are alternately thinned out in the horizontal direction. In FIG. 8, the first field and the third field that have been thinned out are shown. On the other hand, in the odd-numbered field of the 525p signal, odd-numbered lines are thinned out. On each even-numbered line, pixels are alternately thinned out in the horizontal direction. FIG. 8 also shows the second field of which pixels have been thinned out.

In FIG. 7, the thin-out filter 51 generates a interlace picture signal and supplies it to tap selecting circuits 101, 110, 111, and 120. The tap selecting circuit 101 selects predictive taps used in a calculation of a normal equation (that will be described later). The tap selecting circuit 101 supplies the selected predictive taps to normal equation adding circuits 61 and 62. On the other hand, the tap selecting circuits 110 and 111 select spatial class taps of the line data y1 and y2 and supply the selected spatial taps to spatial class detecting circuits 112 and 113, respectively. The tap selecting circuit 120 selects motion class taps and supplies the selected motion class taps to a motion class detecting circuit 121.

The spatial class detecting circuits 112 and 113 compress data of the spatial class taps corresponding to the ADRC method and detect spatial class values of the line data y1 and y2, respectively. The motion class detecting circuit 121 detects motion class values. Output data of the spatial class detecting circuit 112 and the motion class detecting circuit 121 is supplied to a class combining circuit 130. In addition, output data of the spatial class detecting circuit 113 and the motion class detecting circuit 121 are supplied to a class combining circuit 131. The class combining circuit 130 combines the spatial class value and the motion class value of the line data y1. The class combining circuit 131 combines the spatial class value and the motion class value of the line data y2. Output data of the class combining circuit 130 and the class combining circuit 131 are supplied to the normal equation adding circuits 61 and 62, respectively.

The normal equation adding circuit 61 performs an adding operation for obtaining data of a normal equation having a solution of predictive coefficients for predicting and generating the line data y1 corresponding to the input SD signal, the output data of the tap selecting circuit 101, and the output data of the class combining circuit 130. Likewise, the normal equation adding circuit 62 performs an adding operation for obtaining data of a normal equation having a solution of predictive coefficients for predicting and generating the line data y2 corresponding to the input SD signal, the output signal of the tap selecting circuit 101, and the output data of the class combining circuit 131.

The normal equation adding circuits 61 and 62 supply their calculated data to a temporary predictive coefficient determining circuit 63. The temporary predictive coefficient determining circuit 63 performs a calculating process for solving the normal equation corresponding to the received data, calculates temporary predictive coefficients for predicting and generating the line data y1 and y2 and supplies the calculated temporary predictive coefficients to a adjacent coefficient class integrating process portion 64. The temporary predictive coefficients are not final predictive coefficients because they are determined as the result of the class integrating process (that will be described later). The calculating process for solving the normal equation is the same as that of a predictive coefficient determining circuit 263 (that will be described later with reference to FIG. 9).

The adjacent coefficient class integrating process portion 64 calculates the distance d between the temporary predictive coefficients corresponding to the following formula (4).

$$d = \frac{\sum_{l=1}^{n} |k_l - k'_l|^2}{n} \quad (4)$$

where k1 and k1' represent predictive coefficients of different classes; 1 represents a predictive tap number; and n represents the total number of predictive taps.

The adjacent coefficient class integrating process portion 64 compares the distances of predictive coefficients of different classes with a predetermined threshold value and integrates a plurality of classes whose distance is smaller than the threshold value into one class. By integrating a plurality of classes, the total number of classes can be decreased. When distances of particular classes are smaller than the threshold value, classes whose distance is minimum are integrated. As the threshold value becomes large, the number of classes that can be deleted becomes large. Thus, by varying the threshold value, the number of classes obtained in the class value converting process can be adjusted.

At this point, by properly assigning classes to the line data y1 and y2 corresponding to particular conditions such as the storage capacity of the memory resource (the coefficient memory 41 shown in FIG. 2) of the picture information converting process system, the memory resource can be effectively used. In addition, with a smaller number of classes, the picture information converting process can be effectively performed.

The adjacent coefficient class integrating process portion 64 supplies information for integrating classes to a class value converting table generating portion 65. The class value converting table 65 generates a class value conversion table corresponding to the received information. The class value conversion table is supplied to the class value converting circuits 32 and 33 (see FIG. 2) and class value converting circuits 81 and 82 (that will be described later with reference to FIG. 9). The class value converting circuits 32 and 33 and the class value converting circuits 81 and 82 store and reference the class value conversion table.

Figure 9:
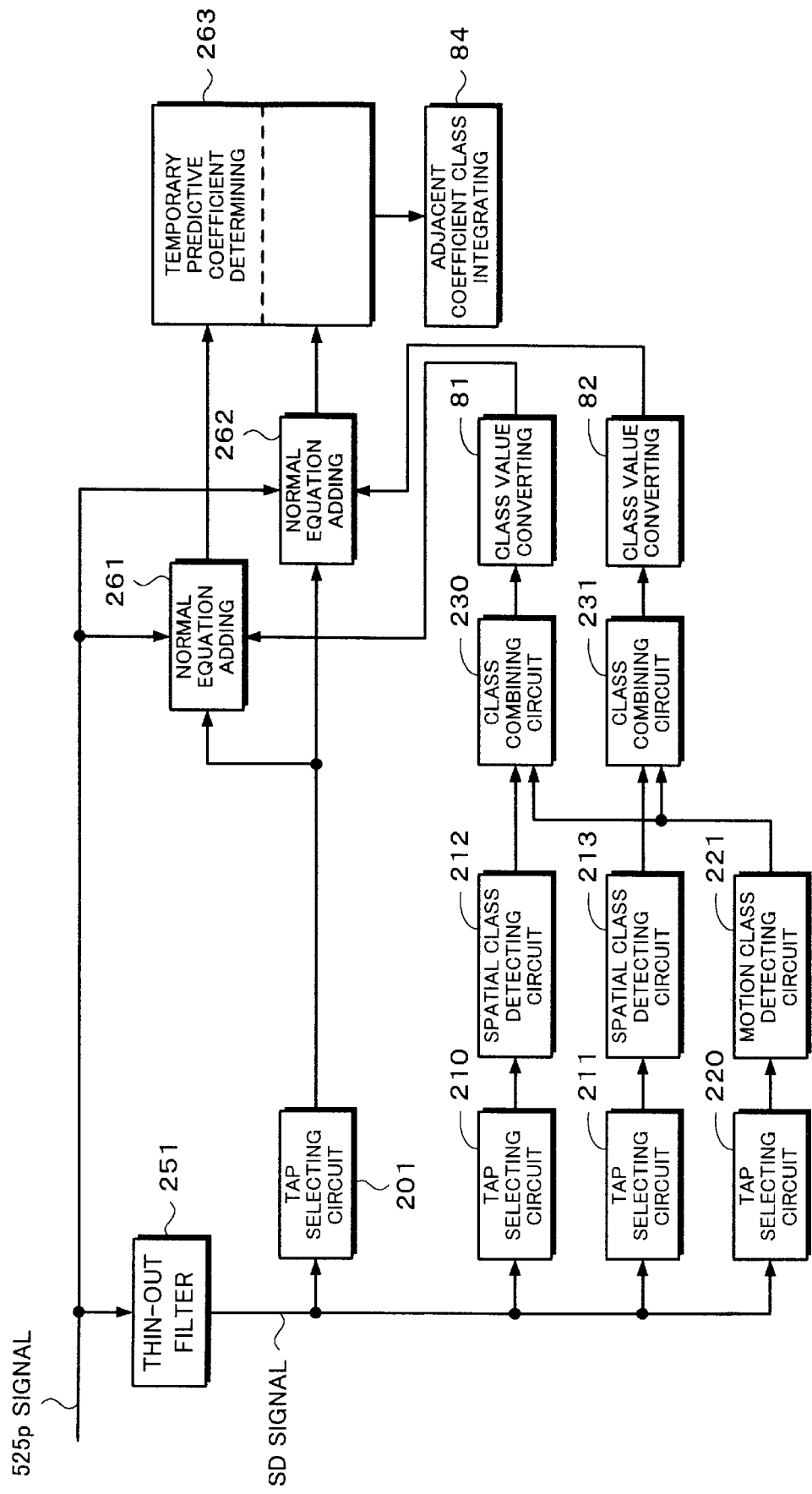
FIG. 9 is a block diagram showing an example of the structure of the predictive coefficient calculating process system according to the first embodiment of the present invention.

Next, a predictive coefficient calculating process as a second learning stage will be described. FIG. 9 shows an example of the structure of a predictive coefficient calculating process system that calculates predictive coefficients. A known signal (for example, a 525p signal) in the same signal format as an output picture signal is supplied to a thin-out filter 251 and normal equation adding circuits 261 and 262. The thin-out filter 251 thins out the number of pixels by ½ in each of the horizontal and vertical directions. Thus, the thin-out filter 251 generates an SD signal (for example, a 525i signal) with pixels that are ¼ as small as those of the input signal.

In the thin-out process, a vertical thin-out filter thins out pixels of the input picture signal so that the frequency in the vertical direction of the input picture signal is halved. In addition, a horizontal thin-out filter thins out pixels of the input picture signal so that the frequency in the horizontal direction of the input picture signal is halved. The thin-out filter 251 supplies the SD signal to tap selecting circuits 201, 210, 211, and 220. By varying the characteristics of the thin-out filter 251, the learning characteristics are varied. Thus, the picture quality of the picture to be converted can be controlled.

The tap selecting circuit 201 selects predictive taps and supplies the selected predictive taps to normal equation adding circuits 261 and 262. The tap selecting circuits 210 and 211 select spatial class taps for the line data y1 and y2 and supplies the selected spatial class taps to spatial class detecting circuits 212 and 213, respectively. A tap selecting circuit 220 selects predictive taps and supplies the selected predictive taps to a motion class detecting circuit 221.

The spatial class detecting circuits 212 and 213 detect spatial class values for the line data y1 and y2 corresponding to the received spatial class taps, respectively. The motion class detecting circuit 221 detects a motion class value corresponding to the received motion class taps. Output data of the spatial class detecting circuit 212 and the motion class detecting circuit 212 is supplied to a class combining circuit 230. In addition, output data of the spatial class detecting circuit 212 and the motion class detecting circuit 221 is supplied to a class combining circuit 231. The class combining circuits 230 and 231 combine class values for the line data y1 and y2 and supply the combined class values to class value converting process portions 81 and 82, respectively.

The class value converting process portions 81 and 82 store the above-mentioned class value conversion table. With reference to the class value conversion table, the class value converting process portions 81 and 82 convert the class values received from the class combining circuits 230 and 231, respectively. The class value converting process portions 81 and 82 supply the resultant class values to the normal equation adding circuits 261 and 262, respectively.

The normal equation adding circuits 261 and 262 calculate data used in a calculating process for solving a normal equation having a solution of predictive coefficients. In other words, the normal equation adding circuit 261 performs an adding process corresponding to the input SD signal, the output data of the tap selecting circuit 201, and the output data of the class value converting circuit 81 and obtains data necessary for solving a normal equation having a solution of predictive coefficients for predicting and generating the line data y1. Likewise, the normal equation adding circuit 262 performs an adding process corresponding to the input SD signal, the output data of the tap selecting circuit 201, and the output data of the class value converting circuit 82 and obtains data necessary for solving a normal equation having a solution of predictive coefficients for predicting and generating the line data y2.

Data obtained by the normal equation adding circuits 261 and 262 is supplied to a predictive coefficient determining circuit 263. The predictive coefficient determining circuit 263 performs a calculating process for solving a normal equation corresponding to the received data and obtains predictive coefficients for predicting and generating the line data y1 and y2. The obtained predictive coefficients are supplied to a coefficient memory 84. The coefficient memory 84 stores the predictive coefficients.

Next, the predictive coefficient determining process (performed by the normal equation adding circuits 261 and 262 and the predictive coefficient determining circuit 263) will be described in detail. First of all, a normal equation will be described. As described above, with n predictive taps, pixels that compose the line data y1 and y2 can be successively predicted and generated corresponding to formula (1).

In formula (1), predictive coefficients w1, . . . , and wn are initially indeterminate coefficients. A plurality of pieces of signal data are learned for individual classes. When the total number of pieces of signal data is denoted by m, the following formula (5) is given corresponding to formula (1).

$$yk = w1 \times xk1 + w2 \times xk2 + \ldots + wn \times xkn \quad (5)$$

where k=1, 2, . . . , m

In the case of m>n, since the predictive coefficients w1, . . . , and wn are not uniquely defined, elements ek of an error vector e are defined by the following formula (6). Predictive coefficients that minimize the error vector e defined by formula (7) are obtained. In other words, predictive coefficients are uniquely obtained by so-called method of least squares.

$$ek = yk - \{w1 \times xk1 + w2 \times xk2 + \ldots + wn \times xkn\} \quad (6)$$

where k=1, 2, . . . , m $$e^2 = \sum_{k=0}^{m} e_k^2 \quad (7)$$

To obtain predictive coefficients that minimize e2 of formula (7), e2 is partially differentiated with predictive coefficients wi (where i=1, 2, . . . ) (formula (8)). Each predictive coefficient wi is defined so that the partial differential value of each value of i becomes 0.

$$\frac{\partial e^2}{\partial w_i} = \sum_{k=0}^{m} 2\left(\frac{\partial e_k}{\partial w_i}\right) e_k = \sum_{k=0}^{m} 2x_{id} \cdot e_k \quad (8)$$

Next, a practical process for defining each predictive coefficient wi corresponding to formula (8) will be described. When Xji and Yi are defined as formulas (9) and (10), formula (8) can be written as a matrix of formula (11).

$$X_{ji} = \sum_{p=0}^{m} x_{pi} \cdot x_{pj} \quad (9)$$

$$Y_i = \sum_{k=0}^{m} x_{ki} \cdot y_k \quad (10)$$

$$\begin{bmatrix} x_{11} & x_{12} & \cdots & x_{1n} \\ x_{21} & x_{22} & \cdots & x_{2n} \\ \cdots & \cdots & \cdots & \cdots \\ x_{n1} & x_{n2} & \cdots & x_{nn} \end{bmatrix} \begin{bmatrix} w_1 \\ w_2 \\ \cdots \\ w_n \end{bmatrix} = \begin{bmatrix} Y_1 \\ Y_2 \\ \cdots \\ Y_n \end{bmatrix} \quad (11)$$

Formula (11) is referred to as normal equation. The normal equation adding circuits 261 and 262 calculate data of the normal equation (namely, Xji and Yi of formulas (9) and (10)) corresponding to the class values received from the class value converting circuits 81 and 82, the predictive taps received from the predictive tap selecting circuit 201, and the known picture signal in the same signal format as the input picture signal and supply the obtained data of the normal equation to a predictive coefficient determining portion 263. The predictive coefficient determining portion 263 performs a calculating process for solving the normal equation corresponding to a conventional matrix solving method such as sweep-out method with the data of the normal equation and obtains predictive coefficients wi.

The predictive coefficients generated in such a manner are calculated corresponding to data of which class values have been converted. In contrast, temporary predictive coefficients described with reference to FIG. 7 are obtained corresponding to data of which class values have not been converted. Except for such a difference, the predictive coefficients and the temporary predictive coefficients are obtained in the same calculating process as a solution of the normal equation. Thus, the process for determining the temporary predictive coefficients is the same as the process performed in the normal equation adding circuits 61 and 62 and the predictive coefficient determining circuit 63.

In other words, in FIG. 7, the normal equation adding circuits 61 and 62 calculate data of the normal equation (namely, the values of Xji and Yi of formulas (9) and (10)) with the class values received from the class combining circuits 130 and 131, the predictive taps received from the predictive tap selecting circuit 101, and the known input picture signal (for example, a 525p signal) in the same signal format as the output picture signal and supply the calculated data of the normal equation to the temporary predictive coefficient determining portion 63. The temporary predictive coefficient determining portion 63 performs a calculating process for solving the normal equation corresponding to a conventional matrix solving method such as sweep-out method with the data of the normal equation.

In such a manner, temporary predictive coefficients are obtained. With the calculated temporary predictive coefficients, a class value conversion table is generated. With reference to the class value conversion table, while class values are being converted, predictive coefficients are obtained. As a result, predictive coefficients for estimating a considered pixel of a progressive picture as a value that is statistically closest to a true value for each class are stored in the predictive coefficient memory 84. The predictive coefficients are loaded to the predictive coefficient memory 41 of the picture information converting process system shown in FIG. 2.

The picture signal converting process system shown in FIG. 5, the class value conversion table generating process system shown in FIG. 7, and the predictive coefficient process system shown in FIG. 9 may be separately disposed. Alternatively, with a switch or the like, these systems may be used in common. However, when such process systems are separately disposed, structural elements having the same function should have the same operating characteristics so as to secure the validity of the learning process. For example, the tap selecting circuits 1, 51, and 201 should have the same operating characteristics. When the structural elements are used in common, although the process of the apparatus becomes complicated due to the switching operations, the circuit scale of the apparatus is reduced. Thus, the cost of the apparatus can be reduced.

The number of predictive taps that are output from the tap selecting circuit 201 is larger than the number of predictive taps used in the picture information conversing process system. Thus, in the predictive coefficient determining portion 263 shown in FIG. 9, more coefficients for individual classes are obtained. Predictive coefficients are selected in the order of the largest absolute value.

Figure 10:
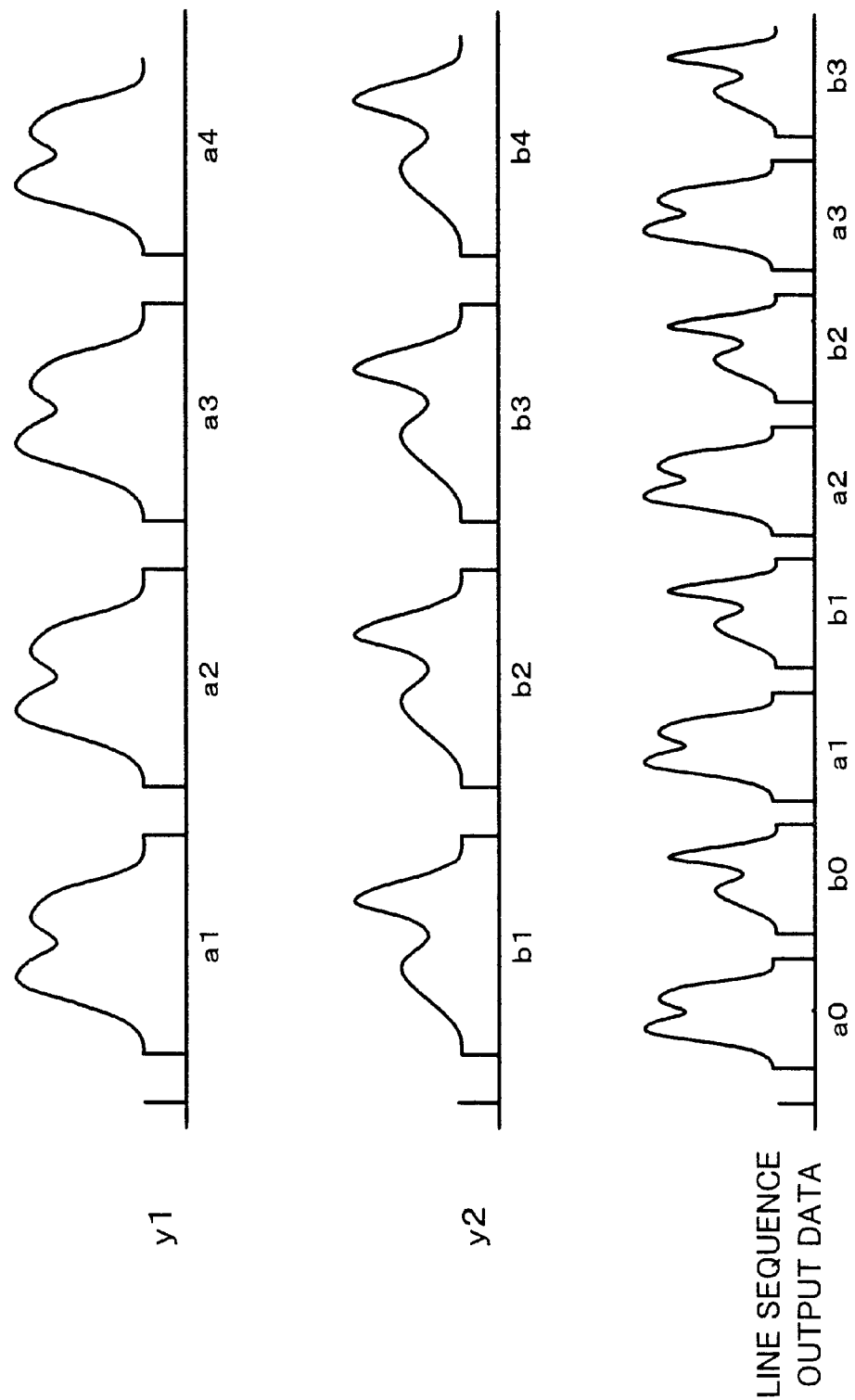
FIG. 10 is a schematic diagram for explaining a line double speed process.

Next, the line double speed process performed by the line sequence converting circuit 6 will be described. The horizontal period of the 525p signal generated by the estimation predictive calculating circuit 4 and 5 is the same as the horizontal period of the 525i signal of which the picture information converting process has not been performed. The line sequence converting circuit 6 has a line memory and performs a line double speed process for doubling the horizontal period therewith. FIG. 10 shows waveforms of analog signals of which the line double speed process is performed. The estimation predictive calculating circuits 4 and 5 predict and generate the line data y1 and y2, respectively.

The line data y1 contains lines a1, a2, a3, and so forth in the order. The line data y2 contains lines b1, b2, b3, and so forth in the order. The line sequence converting circuit 6 has a line doubler and a switching circuit (not shown). The line doubler compresses data of each line by ½ in the time axis direction and supplies the compressed data to the switching circuit. The switching circuit alternately selects received data and outputs the selected data. Thus, line sequence output data (a0, b0, a1, b1, and so forth) is formed.

In the first embodiment, an output pixel value (line data L1) of the current line and an output pixel value (line data L2) of a new line are generated at a time. Alternatively, with an additional memory, when the operation speed is sufficiently high, after line data y1 and y2 are successively generated on time division basis, the line double speed process may be performed for the line data y1 and y2.

Figure 11:
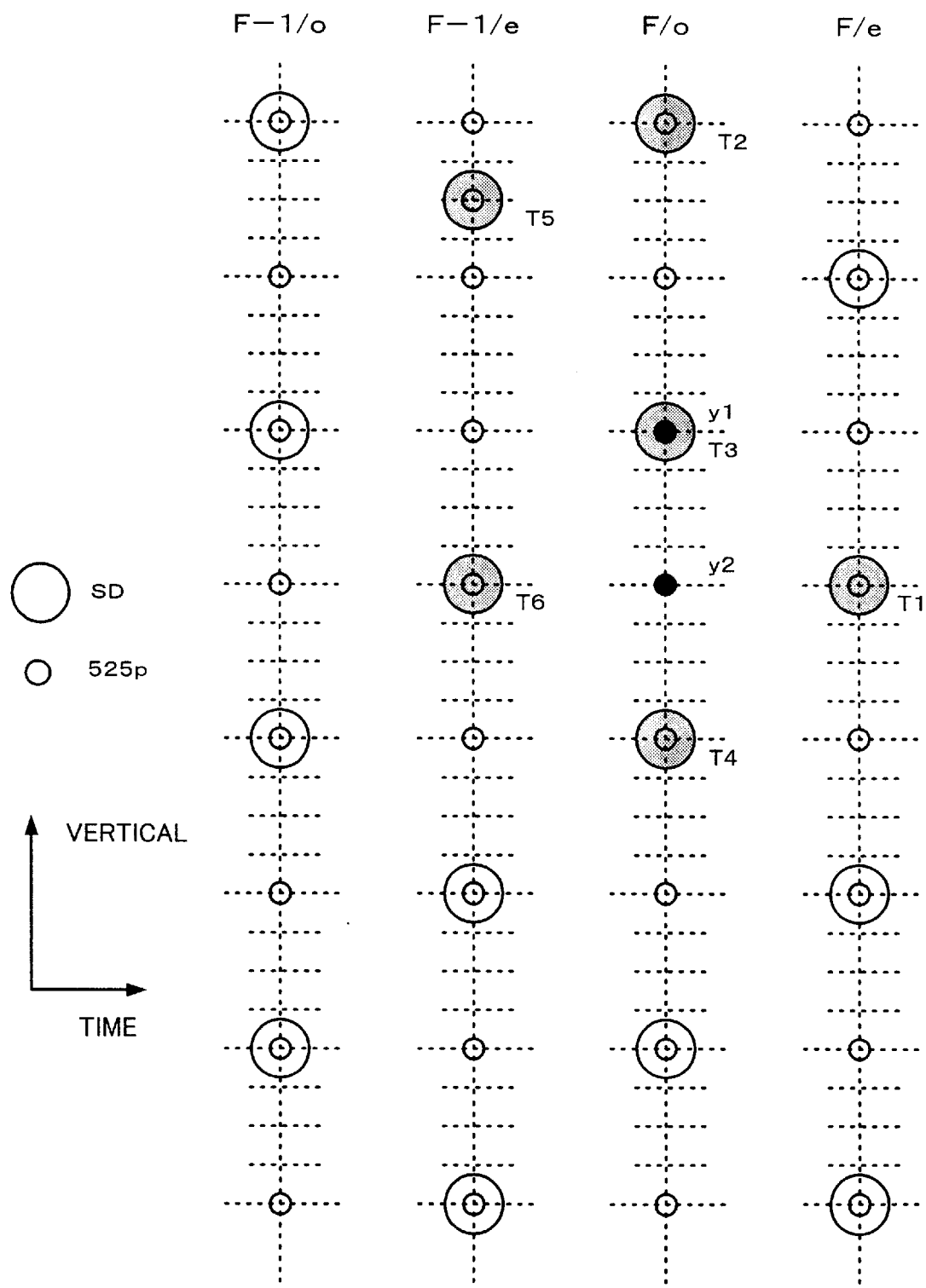
FIG. 11 is a schematic diagram showing an example of the arrangement of spatial class taps according to a second embodiment of the present invention.

In the first embodiment according to the present invention, as shown in FIGS. 3 and 4, the arrangement of spatial class taps of the line data y1 is different from that of the line data y2 (the number of spatial class taps of the line data y1 is 5, whereas the number of spatial class taps of the line data y2 is 6). Unlike with the first embodiment of the present invention, the number of spatial class taps of the line data y1 may be the same as that of the line data y2. This arrangement will be described as a second embodiment of the present invention. FIG. 11 shows the arrangement of spatial class taps of the line data y1 and y2 according to the second embodiment of the present invention. The notation of FIG. 11 is the same as the notation of FIG. 3. As spatial class taps of the line data y1 and y2 of the field F/o, a total of six pixels—pixels T5 and T6 of the field F−1/e, pixels T2, T3, and T4 of the field F/o, and a pixel T6 of the field F/e are used. When the motion class values of the line data y1 are the same as those of the line data y2 and the number of motion class values is 4, the number of classes of each of the line data y1 and y2 is $2^6 \times 4 = 256$.

Figure 12:
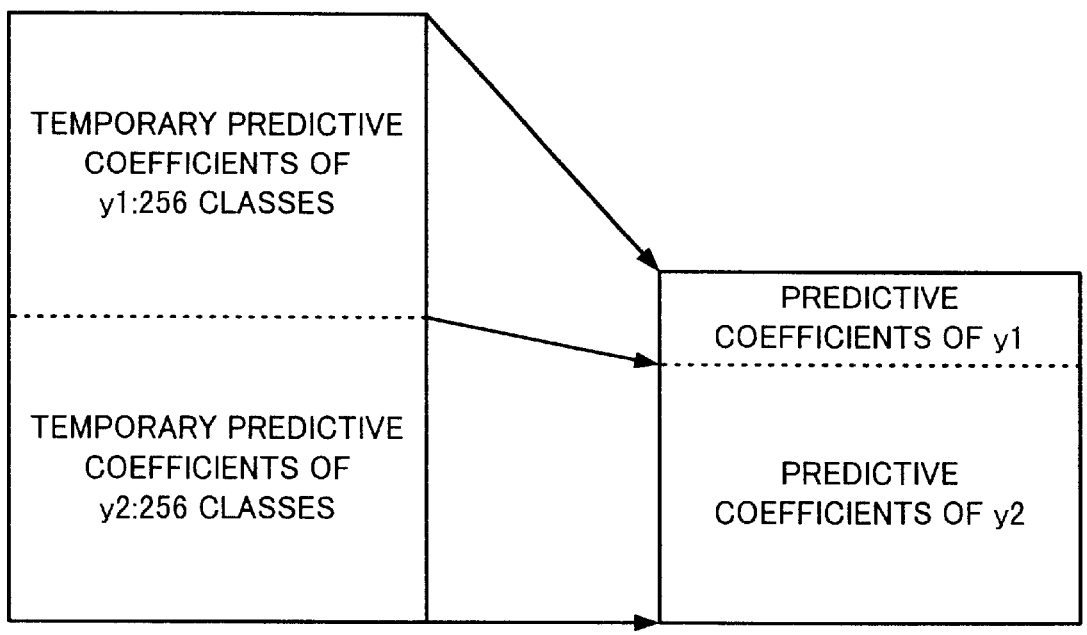
FIG. 12 is a schematic diagram for explaining a class integration according to the second embodiment of the present invention.

FIG. 12 shows the state of which number of classes is decreased in the class value converting process. Before the class value converting process is performed, the number of classes of each of the line data y1 and y2 is 256. However, after the class value converting process is performed, the number of classes of the line data y1 is smaller than that of the line data y2. This is because it is more difficult to predict and generate the line data y2 than the line data y1.

Next, with reference to FIG. 13, the structure of a picture information converting process system according to the second embodiment of the present invention will be described. For simplicity, in FIG. 13, similar structural elements to those in FIG. 4 are denoted by similar reference numerals. As described above, in the second embodiment, since the arrangement of spatial class taps of the line data y1 is the same as that of the line data y2, the structure of a spatial class detecting portion for the line data y1 is in common with that for the line data y2. To do that, a spatial class detecting circuit 16 and a tap selecting circuit 15 are disposed. The tap selecting circuit 15 selects a spatial class. The tap selecting circuit 15 is disposed upstream of the spatial class detecting circuit 16.

A spatial class value that is output from the spatial class detecting circuit 16 and a motion class value that is output from a motion class detecting circuit 21 are supplied to a class combining circuit 17. The class combining circuit 17 combines the spatial class value and the motion class value.

Output data of the class combining circuit 17 is supplied to class value converting circuits 18 and 19. The class value converting circuits 18 and 19 perform a class value converting process for the output data of the class combining circuit 17 and generate converted class values of the line data y1 and y2, respectively. The class value converting process is performed so that classes are obtained corresponding to the difficulty for predicting and generating the line data y1 and y2. Output data of the class value converting circuits 18 and 19 is supplied to a coefficient memory 41.

In the second embodiment of the present invention, since the structure of the spatial class detecting portion for the line data y1 is in common with that for the line data y2, the structure of the apparatus can be simplified. On the other hand, in the class value converting process, the number of classes for the line data y1 is more reduced than that for the line data y2. Thus, since the class value converting process for the line data y1 may become complicated, the structure for detecting spatial classes for the line data y1 and the structure for detecting spatial classes for the line data y2 may be separately disposed as with the structure shown in FIG. 2.

In the first and second embodiments of the present invention, a 525i signal is converted into a 525p signal. However, according to the present invention, the number of scanning lines is not limited to 525. For example, an output picture signal composing lines having pixels that are not twice those in the horizontal direction of an input SD signal may be predicted and generated. In reality, the present invention can be applied for a picture information converting process for predicting and generating an interlace picture signal (a 1050i signal) as an output picture signal.

Figure 14:
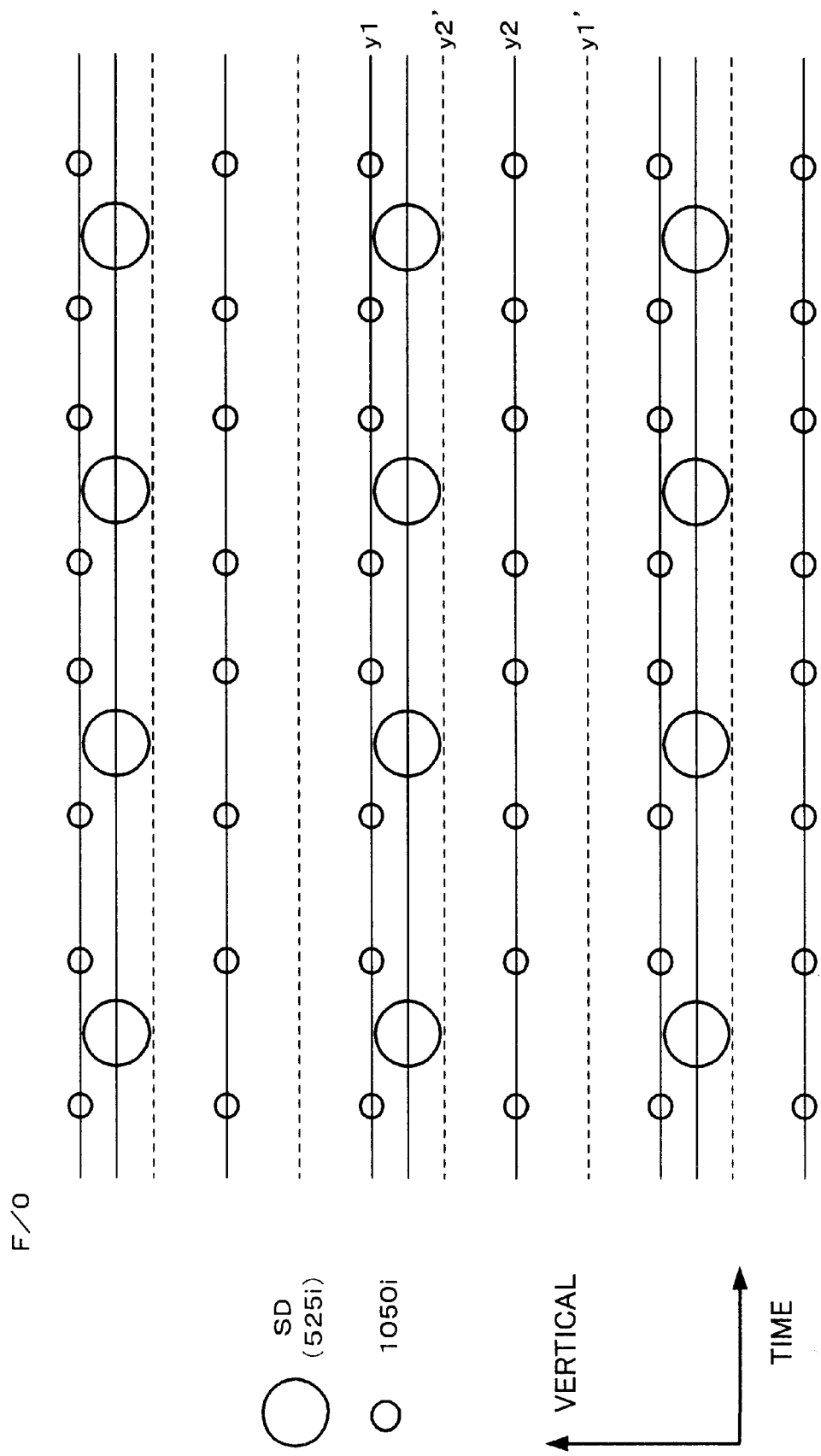
FIG. 14 is a schematic diagram showing an example of the arrangement of pixels in a picture information converting process according to the second embodiment of the present invention.

Next, such a picture information converting process will be described in detail. FIG. 14 shows the arrangement of pixels of a 521 signal and a 1050i signal as a picture of one field. In FIG. 14, large dots represent pixels of the 525i signal, whereas small dots represent pixels of the 1050i signal. In FIG. 14, solid lines represent lines of an odd field of a particular frame, whereas doted lines represent another field (even field) of the frame. Each line of the even field deviates from each line of the odd field by 0.5 lines. On the lines of the even field, pixels of line data y1' and y2' are formed.

Figure 15:
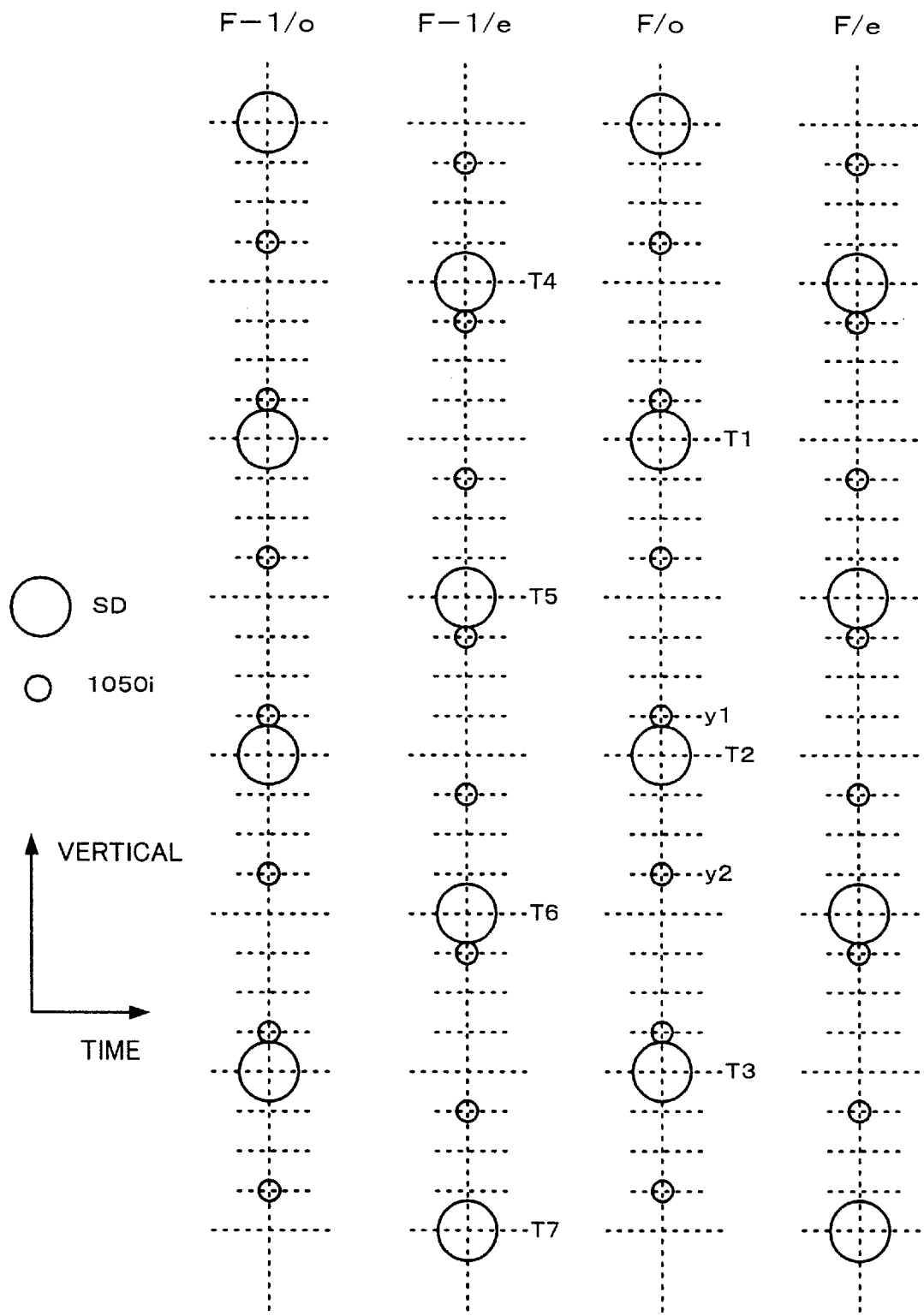
FIG. 15 is a schematic diagram showing an example of the arrangement of spatial class taps according to the second embodiment of the present invention.

FIG. 15 shows the arrangement of spatial class taps in such a case. The notation of FIG. 15 is the same as the notation of FIG. 3. As spatial class taps for the line data y1 and y2 of the field F/o, a total of seven pixels—pixels T4, T5, T6, and T7 of the field F−1/e and pixels T1, T2, and T3 of the field F/o are used. When the motion class values of the line data y1 are the same as those of the line data y2 and the number of motion class values is 4, the number of classes of each of the line data y1 and y2 is $2^7 \times 4 = 512$.

Figure 13:
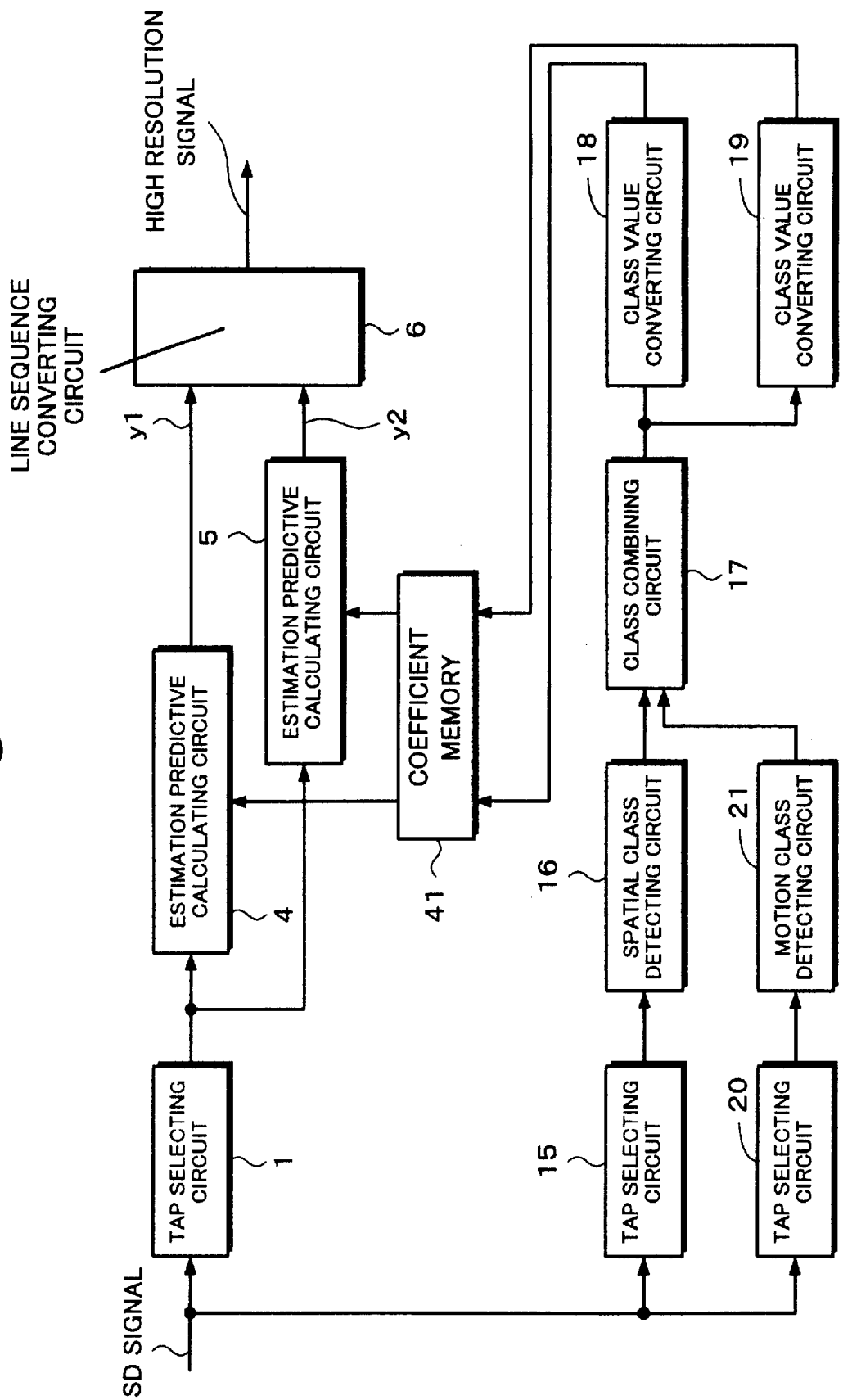
FIG. 13 is a block diagram showing an example of the structure of a picture information converting process system according to the second embodiment of the present invention.

When the spatial class taps are arranged in such a manner, a picture information converting process can be performed with the structure shown in FIG. 13. However, according to the present invention, spatial class taps may be arranged in a different manner. For example, the arrangement of spatial class taps for the line data y1 may be different from that for the line data y2. Alternatively, a plurality of input pixels in the horizontal direction may be used as spatial class taps.

Figure 16:
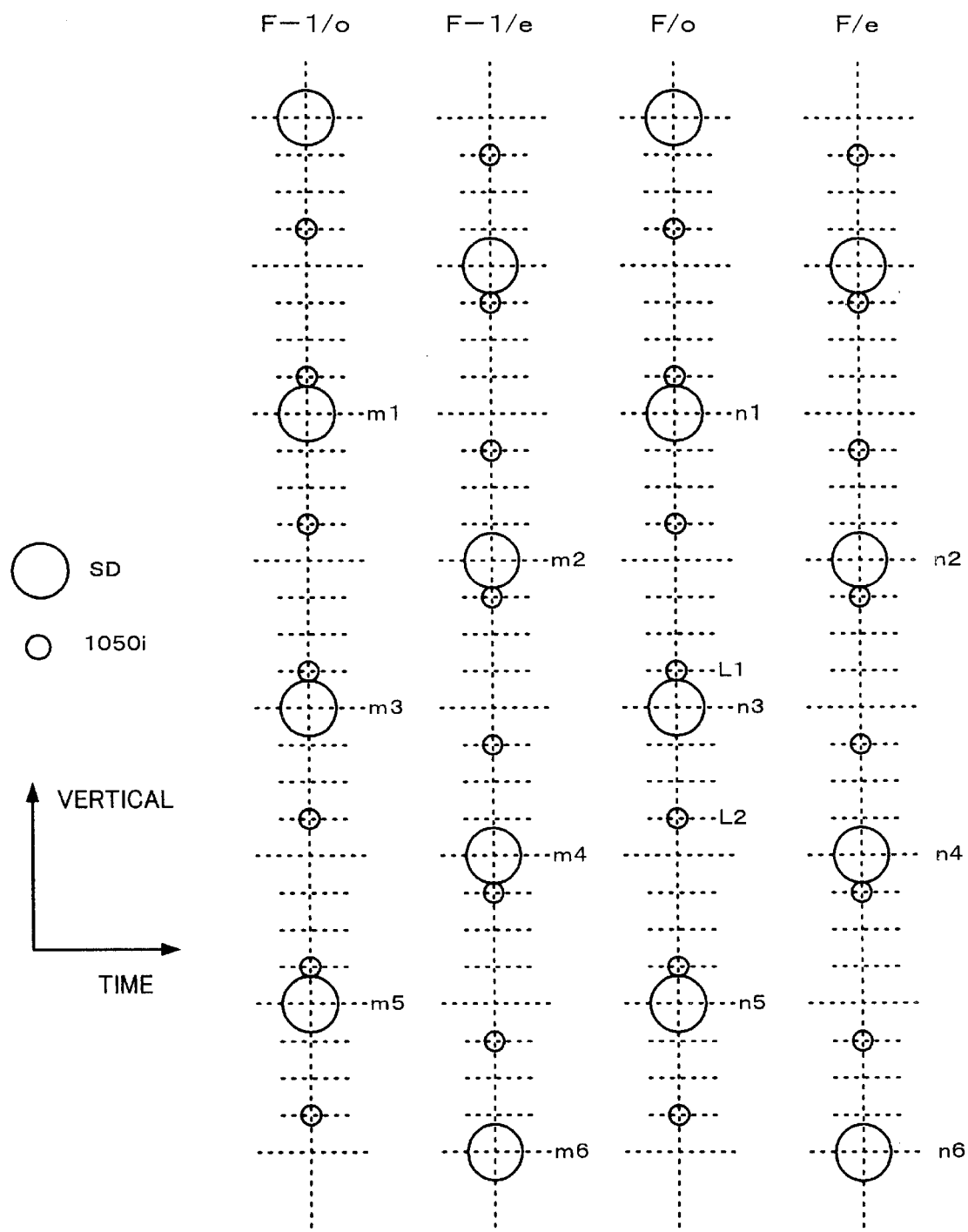
FIG. 16 is a schematic diagram showing an example of the arrangement of motion class taps according to the second embodiment of the present invention.

FIG. 16 shows an example of the arrangement of motion class taps in the case shown in FIG. 15. As motion class taps used for predicting line data y1 and y2 in the field F/o, pixels n1, n3, and n5 of the field F/o, pixels n2, n4, and n6 of the field F/e, pixels m2, m4, and m6 of the field F−1/e, and pixels m1, m3, and m5 of the field F−1/o are used. In this example, the vertical positions of the pixels m1, m2, . . . , and m6 match those of the pixels n1, n2, . . . , and n6, respectively. However, according to the present invention, the arrangement of the motion class taps is not limited to that shown in FIG. 13.

According to the present invention, when a picture information converting process for converting an input picture signal into an output picture signal with a different scanning line structure is performed, the number of classes determined corresponding to each of a plurality of considered points at non-scanning-line positions of the input picture signal (the considered points are for example y1 at a position of a scanning line of the input picture signal, y2 at a position between adjacent two scanning lines, and so forth) is decreased corresponding to the relation of positions of the considered points to the scanning lines of the input picture signal (for example, many classes are assigned to y2 that is difficult to predict and generate).

Thus, since the number of classes is assigned corresponding to the storage capacity of the memory resource of the apparatus, even if the storage capacity of the memory resource is insufficient, the process can be properly performed. In addition, the present invention can be effectively applied for the case that the process is performed with a small number of classes.

Moreover, classes can be properly assigned for each considered point corresponding to the difficulty (for example, y1 and y2) for predicting and generating pixels due to the difference between positions of a considered point and a scanning line of the input picture signal. Thus, even if the storage capacity of the memory resource is restricted, a picture information converting process can be precisely and effectively performed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A picture information converting apparatus for generating an output picture signal with a different scanning line structure from an input picture signal, comprising:

first picture data selecting means for selecting adjacent pixels with a predetermined relation of positions to a plurality of considered points with a different relation of positions to scanning lines of the input picture signal;

spatial class detecting means for detecting a pattern of a level distribution from picture data selected by said first picture data selecting means and determining spacial class values that represent spatial classes of the considered points corresponding to the detected pattern;

second picture data selecting means for selecting the considered points and adjacent pixels with the predetermined relation of positions to the considered points from the input picture signal;

calculating process means for performing a calculating process for predicting and generating pixels at positions with a predetermined relation of positions to the considered points corresponding to the picture data obtained by said second picture data selecting means;

storing means for storing predetermined predictive coefficient data used in the calculating process of said calculating process means; and class value converting means for performing a class value converting process for a first class value with a relation of positions to the considered points and the input picture signal and generating a second class value corresponding to the predictive coefficient data.

2. A picture information converting apparatus for generating an output picture signal with a different scanning line structure from an input picture signal, comprising:

first picture data selecting means for selecting adjacent pixels with a predetermined relation of positions to a plurality of considered points with a different relation of positions to scanning lines of the input picture signal;

spatial class detecting means for detecting a pattern of a level distribution from picture data selected by said first picture data selecting means and determining spacial class values that represent spatial classes of the considered points corresponding to the detected pattern;

second picture data selecting means for selecting adjacent pixels with the predetermined relation of positions to the considered points from a plurality of frames of the input picture signal;

motion class detecting means for calculating the sum of the absolute values of frame differences with the picture data selected by said second picture data selecting means and determining motion class values corresponding to the calculated result, the motion class values representing motions;

class combining means for combining the spatial class values and the motion class values so as to generate a first class value;

third picture data selecting means for selecting the considered points and adjacent pixels with the predetermined relation of positions to the considered points from the input picture signal;

calculating process means for performing a calculating process for predicting and generating pixels at positions with a predetermined relation of positions to the considered points corresponding to the picture data obtained by said third picture data selecting means;

storing means for storing predetermined predictive coefficient data used in the calculating process of said calculating process means; and class value converting means for performing a class value converting process for the first class value with a relation of positions to the considered points and the input picture signal and generating a second class value corresponding to the predictive coefficient data.

3. The picture information converting apparatus as set forth in claim 2, wherein said class value converting means performs the class value converting process with reference to a class value conversion table generated by a learning process for a particular picture signal in the same signal format as the output picture signal.

4. The picture information converting apparatus as set forth in claim 3, wherein the class value conversion table is a data table for calculating temporary predictive coefficients corresponding to the first class value so that the difference of calculated values of a linear combination of pixel values of a predetermined picture signal in the same signal format as the output picture signal and picture data selected by said third picture data selecting means becomes minimum, calculating distances between the temporary predictive coefficients, and when a calculated distance is equal to or less than a predetermined threshold value, integrating classes represented by the first class value corresponding to the temporary predictive coefficients, and wherein the predictive coefficient data is included in the temporary predictive coefficients and corresponds to the second class value.

5. The picture information converting apparatus as set forth in claim 4, wherein the predetermined threshold value is set corresponding to the storage capacity of said storing means.

6. The picture information converting apparatus as set forth in claim 4, wherein the predetermined threshold value is set corresponding to the relation of positions between the considered points and the scanning lines of the input picture signal.

7. The picture information converting apparatus as set forth in claim 2, wherein the input picture signal is an interlace picture signal with 525 scanning lines, and wherein the output picture signal is a progressive picture signal with 525 scanning lines.

8. The picture information converting apparatus as set forth in claim 2, wherein the input picture signal is an interlace picture signal with 525 scanning lines, and wherein the output picture signal is a progressive picture signal with 1050 scanning lines.

9. A picture information converting method for generating an output picture signal with a different scanning line structure from an input picture signal, comprising the steps of:

(a) selecting adjacent pixels with a predetermined relation of positions to a plurality of considered points with a different relation of positions to scanning lines of the input picture signal;

(b) detecting a pattern of a level distribution from picture data selected at step (a) and determining spacial class values that represent spatial classes of the considered points corresponding to the detected pattern;

(c) selecting the considered points and adjacent pixels with the predetermined relation of positions to the considered points from the input picture signal;

(d) performing a calculating process for predicting and generating pixels at positions with a predetermined relation of positions to the considered points corresponding to the picture data obtained at step (c);

(e) storing predetermined predictive coefficient data used in the calculating process of step (d); and (f) performing a class value converting process for a first class value with a relation of positions to the considered points and the input picture signal and generating a second class value corresponding to the predictive coefficient data.

10. A picture information converting method for generating an output picture signal with a different scanning line structure from an input picture signal, comprising the steps of:

(a) selecting adjacent pixels with a predetermined relation of positions to a plurality of considered points with a different relation of positions to scanning lines of the input picture signal;

(b) detecting a pattern of a level distribution from picture data selected at step (a) and determining spacial class values that represent spatial classes of the considered points corresponding to the detected pattern;

(c) selecting adjacent pixels with the predetermined relation of positions to the considered points from a plurality of frames of the input picture signal;

(d) calculating the sum of the absolute values of frame differences with the picture data selected at step (c) and determining motion class values corresponding to the calculated result, the motion class values representing motions;

(e) combining the spatial class values and the motion class values so as to generate a first class value;

(f) selecting the considered points and adjacent pixels with the predetermined relation of positions to the considered points from the input picture signal;

(g) performing a calculating process for predicting and generating pixels at positions with a predetermined relation of positions to the considered points corresponding to the picture data obtained at step (f);

(h) storing predetermined predictive coefficient data used in the calculating process of step (g); and (i) performing a class value converting process for the first class value with a relation of positions to the considered points and the input picture signal and generating a second class value corresponding to the predictive coefficient data.

11. The picture information converting method as set forth in claim 10, wherein step (i) is performed as the class value converting process with reference to a class value conversion table generated by a learning process for a particular picture signal in the same signal format as the output picture signal.

12. The picture information converting method as set forth in claim 11, wherein the class value conversion table is a data table for calculating temporary predictive coefficients corresponding to the first class value so that the difference of calculated values of a linear combination of pixel values of a predetermined picture signal in the same signal format as the output picture signal and picture data selected at step (f) becomes minimum, calculating distances between the temporary predictive coefficients, and when a calculated distance is equal to or less than a predetermined threshold value, integrating classes represented by the first class value corresponding to the temporary predictive coefficients, and wherein the predictive coefficient data is included in the temporary predictive coefficients and corresponds to the second class value.

13. The picture information converting method as set forth in claim 10, wherein the input picture signal is an interlace picture signal with 525 scanning lines, and wherein the output picture signal is a progressive picture signal with 525 scanning lines.

14. The picture information converting method as set forth in claim 10, wherein the input picture signal is an interlace picture signal with 525 scanning lines, and wherein the output picture signal is a progressive picture signal with 1050 scanning lines.

15. A television receiver for generating an output picture signal with a different scanning line structure from an input picture signal, comprising:

first picture data selecting means for selecting adjacent pixels with a predetermined relation of positions to a plurality of considered points with a different relation of positions to scanning lines of the input picture signal;

spatial class detecting means for detecting a pattern of a level distribution from picture data selected by said first picture data selecting means and determining spacial class values that represent spatial classes of the considered points corresponding to the detected pattern;

second picture data selecting means for selecting the considered points and adjacent pixels with the predetermined relation of positions to the considered points from the input picture signal;

calculating process means for performing a calculating process for predicting and generating pixels at positions with a predetermined relation of positions to the considered points corresponding to the picture data obtained by said second picture data selecting means;

storing means for storing predetermined predictive coefficient data used in the calculating process of said calculating process means; and class value converting means for performing a class value converting process for a first class value with a relation of positions to the considered points and the input picture signal and generating a second class value corresponding to the predictive coefficient data.

16. A television receiver for generating an output picture signal with a different scanning line structure from an input picture signal, comprising:

first picture data selecting means for selecting adjacent pixels with a predetermined relation of positions to a plurality of considered points with a different relation of positions to scanning lines of the input picture signal;

spatial class detecting means for detecting a pattern of a level distribution from picture data selected by said first picture data selecting means and determining spacial class values that represent spatial classes of the considered points corresponding to the detected pattern;

second picture data selecting means for selecting adjacent pixels with the predetermined relation of positions to the considered points from a plurality of frames of the input picture signal;

motion class detecting means for calculating the sum of the absolute values of frame differences with the picture data selected by said second picture data selecting means and determining motion class values corresponding to the calculated result, the motion class values representing motions;

class combining means for combining the spatial class values and the motion class values so as to generate a first class value;

third picture data selecting means for selecting the considered points and adjacent pixels with the predetermined relation of positions to the considered points from the input picture signal;

calculating process means for performing a calculating process for predicting and generating pixels at positions with a predetermined relation of positions to the considered points corresponding to the picture data obtained by said third picture data selecting means;

storing means for storing predetermined predictive coefficient data used in the calculating process of said calculating process means; and class value converting means for performing a class value converting process for the first class value with a relation of positions to the considered points and the input picture signal and generating a second class value corresponding to the predictive coefficient data.

17. The television receiver as set forth in claim 16, wherein said class value converting means performs the class value converting process with reference to a class value conversion table generated by a learning process for a particular picture signal in the same signal format as the output picture signal.

18. The television receiver as set forth in claim 17, wherein the class value conversion table is a data table for calculating temporary predictive coefficients corresponding to the first class value so that the difference of calculated values of a linear combination of pixel values of a predetermined picture signal in the same signal format as the output picture signal and picture data selected by said third picture data selecting means becomes minimum, calculating distances between the temporary predictive coefficients, and when a calculated distance is equal to or less than a predetermined threshold value, integrating classes represented by the first class value corresponding to the temporary predictive coefficients, and wherein the predictive coefficient data is included in the temporary predictive coefficients and corresponds to the second class value.

19. The television receiver as set forth in claim 16, wherein the input picture signal is an interlace picture signal with 525 scanning lines, and wherein the output picture signal is a progressive picture signal with 525 scanning lines.

20. The television receiver as set forth in claim 17, wherein the input picture signal is an interlace picture signal with 525 scanning lines, and wherein the output picture signal is a progressive picture signal with 1050 scanning lines.

21. A picture signal converting apparatus comprising:

first picture data selecting means for selecting a first predetermined number of pixels from an input picture signal based upon the position of each pixel relative to a considered point within said input picture signal;

class detecting means for detecting a first class for said considered point by selecting one from a number of first classes in accordance with the first predetermined number of pixels selected by said first picture data selecting means;

class converting means for converting the first class into a second class according to a previously determined conversion table; the number of said second classes being fewer than the number of said first classes;

storing means for storing predictive coefficient data corresponding to the second classes;

second picture data selecting means for selecting a second predetermined number of pixels from an input picture signal based upon the position of each pixel relative to said considered point within said input picture signal; and calculating process means for generating a pixel of an output picture signal corresponding to said considered point by performing a predetermined calculating process using the predictive coefficient data from said storing means that corresponds to said second class from said class converting means and the second predetermined number of pixels selected by said second picture data selecting means.

22. The picture signal converting apparatus according to claim 21, wherein said conversion table is previously determined by a learning apparatus, said learning apparatus comprising:
- coefficient determining means for determining a temporary predictive coefficient data for each of the first classes;
- distance calculating means for calculating the distance between the temporary predictive coefficient data corresponding to each of the first classes;
- class combining means for combining first classes into a second class when the distance between the corresponding temporary predictive coefficient data is equal to or less than a predetermined threshold value; and
- table generating means for generating said conversion table according to the result of the class combining means.

23. The picture signal converting apparatus according to claim 21, wherein said input picture signal is comprised of first scanning lines and said output picture signal is comprised of first and second scanning lines.

24. A picture signal converting method comprising the steps of:
- (a) selecting a first predetermined number of pixels from an input picture signal based upon the position of each pixel relative to a considered point within said input picture signal;
- (b) detecting a first class for said considered point by selecting one from a number of first classes in accordance with the first predetermined number of pixels selected in step (a);
- (c) converting the first class into a second class according to a previously determined conversion table; the number of said second classes being fewer than the number of said first classes;
- (d) storing predictive coefficient data corresponding to the second classes;
- (e) selecting a second predetermined number of pixels from an input picture signal based upon the position of each pixel relative to said considered-point within said input picture signal; and
- (f) generating a pixel of an output picture signal corresponding to said considered point by performing a predetermined calculating process using the predictive coefficient data stored in step (d) that corresponds to said second class from step (c) and the second predetermined number of pixels selected in step (e).

25. The picture signal converting method according to claim 24, wherein said conversion table is previously determined by a learning process, said learning process comprising the steps of:
- determining a temporary predictive coefficient data for each of the first classes;
- calculating the distance between the temporary predictive coefficient data corresponding to each of the first classes;
- combining first classes into a second class when the distance between the corresponding temporary predictive coefficient data is equal to or less than a predetermined threshold value; and
- generating said conversion table according to the result of the combining step.

26. The picture signal converting method according to claim 24, wherein said input picture signal is comprised of first scanning lines and said output picture signal is comprised of first and second scanning lines.

27. An apparatus for generating a class conversion table for use in converting an input picture signal to an output picture signal having a different scanning line structure, comprising:
- filtering means for filtering by half in both the horizontal and vertical directions the number of pixels in an output picture signal;
- first picture data selecting means for selecting a first predetermined number of pixels from the filtered output picture signal based upon the position of each pixel relative to a considered point within said output picture signal;
- class detecting means for detecting a first class for said considered point by selecting one from a number of first classes in accordance with the first predetermined number of pixels selected by said first picture data selecting means;
- second picture data selecting means for selecting a second predetermined number of pixels from the filtered output picture signal based upon the position of each pixel relative to said considered point within said output picture signal; and
- coefficient determining means for determining a temporary predictive coefficient data for said first class by solving a normal equation comprised of said first class, said first predetermined number of pixels from said first picture data selecting means, and said output picture signal;
- class combining means for combining first classes into second classes when the distance between the corresponding temporary predictive coefficient data is equal to or less than a predetermined threshold value; the number of said second classes being fewer than the number of said first classes; each second class having a corresponding predictive coefficient data; and
- table generating means for generating said conversion table according to the result of the class combining means; said conversion table comprising a plurality of first classes and second classes and a corresponding plurality of temporary predictive coefficient data and predictive coefficient data.

28. A method of generating a class conversion table for use in converting an input picture signal to an output picture signal having a different scanning line structure, comprising the steps of:
- (a) filtering by half in both the horizontal and vertical directions the number of pixels in an output picture signal;
- (b) selecting a first predetermined number of pixels from the filtered output picture signal based upon the position of each pixel relative to a considered point within said output picture signal;
- (c) detecting a first class for said considered point by selecting one from a number of first classes in accordance with the first predetermined number of pixels selected in step (b);
- (d) selecting a second predetermined number of pixels from the filtered output picture signal based upon the position of each pixel relative to said considered point within said output picture signal;
- (e) determining a temporary predictive coefficient data for said first class by solving a normal equation comprised of said first class, said first predetermined number of pixels from step (b), and said output picture signal;

(f) combining first classes into second classes when the distance between the corresponding temporary predictive coefficient data is equal to or less than a predetermined threshold value; the number of said second classes being fewer than the number of said first classes; each second class having a corresponding predictive coefficient data; and (g) generating said conversion table according to the result of step (f); said conversion table comprising a plurality of first classes and second classes and a corresponding plurality of temporary predictive coefficient data and predictive coefficient data.

* * * * *